(12) United States Patent
Karunamuni et al.

(10) Patent No.: US 9,626,087 B2
(45) Date of Patent: Apr. 18, 2017

(54) DEVICE, METHOD, AND GRAPHICAL USER INTERFACE FOR NAVIGATING BETWEEN USER INTERFACES

(71) Applicant: Apple Inc., Cupertino, CA (US)

(72) Inventors: Chanaka G. Karunamuni, San Jose, CA (US); Stephen O. Lemay, Palo Alto, CA (US); Imran Chaudhri, San Francisco, CA (US); Nicholas Zambetti, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 358 days.

(21) Appl. No.: 14/291,880

(22) Filed: May 30, 2014

(65) Prior Publication Data

US 2014/0365956 A1    Dec. 11, 2014

Related U.S. Application Data

(60) Provisional application No. 61/832,935, filed on Jun. 9, 2013.

(51) Int. Cl.
*G06F 3/0484* (2013.01)

(52) U.S. Cl.
CPC ................................ *G06F 3/04847* (2013.01)

(58) Field of Classification Search
CPC ................................................... G06F 3/04847
See application file for complete search history.

(56) References Cited

U.S. PATENT DOCUMENTS

| | | | | |
|---|---|---|---|---|
| 2010/0235733 | A1* | 9/2010 | Drislane | G06F 3/04883 715/702 |
| 2010/0240415 | A1* | 9/2010 | Kim | G06F 3/03547 455/565 |
| 2012/0236037 | A1* | 9/2012 | Lessing | G06F 3/017 345/661 |
| 2012/0311429 | A1 | 12/2012 | Decker et al. | |
| 2013/0102366 | A1* | 4/2013 | Teng | H04M 1/67 455/566 |
| 2014/0068475 | A1* | 3/2014 | Li | G06F 17/30861 715/765 |
| 2014/0304646 | A1* | 10/2014 | Rossmann | G06F 3/0482 715/790 |

* cited by examiner

*Primary Examiner* — Anil Bhargava
(74) *Attorney, Agent, or Firm* — Morgan, Lewis & Bockius LLP

(57) ABSTRACT

An electronic device with a display displays a first user interface; detects a first input that includes a first movement. In response to detecting the first input, the device slides the first user interface off in a first direction in accordance with the first movement, where a magnitude of the sliding of the first user interface is determined based on a magnitude of the first movement and a first movement proportionality factor; and concurrently slides the second user interface on in the first direction over the first user interface in accordance with the first movement while sliding the first user interface off the display. A magnitude of the sliding of the second user interface over the first user interface is determined based on a magnitude of the first movement and a second movement proportionality factor that is different from the first movement proportionality factor.

21 Claims, 36 Drawing Sheets

DEVICE, METHOD, AND GRAPHICAL USER INTERFACE FOR NAVIGATING BETWEEN USER INTERFACES

RELATED APPLICATION

This application claims priority to U.S. Provisional Patent Application No. 61/832,935, filed Jun. 9, 2013, which is incorporated by reference herein in its entirety.

TECHNICAL FIELD

This relates generally to electronic devices with touch-sensitive surfaces, including but not limited to electronic devices with touch-sensitive surfaces that display transitions between user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include navigating between user interfaces or content, such as content in a web browser history or levels in a hierarchy of user interfaces. But methods for navigating amongst user interfaces or content are inefficient and do not provide sufficient contextual information for users, which can be confusing and disorienting. In addition, these methods take longer than necessary, thereby wasting energy. This latter consideration is particularly important in battery-operated devices.

SUMMARY

Accordingly, there is a need for electronic devices with faster, more efficient methods and interfaces for navigating between user interfaces. For example, instead of moving a first user interface off of a display at the same rate that a second user interface is being moved onto the display, which does not provide any context as to a direction that the user is navigating in a hierarchy of user interfaces, the rate at which the first user interface is moved off of the display is different from the rate at which the second user interface is moved onto the display. Moving the first user interface off of the display at a rate that is different from the rate at which the second user interface is moved onto the display provides the user with intuitive visual cues as to a direction that the user is navigating in a user interface hierarchy. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display, and optionally a touch-sensitive surface. The method includes: displaying a first user interface on the display; detecting a first input that includes a first movement and that corresponds to a request to replace the first user interface with a second user interface; in response to detecting the first input: sliding the first user interface off of the display in a first direction in accordance with the first movement, where a magnitude of the sliding of the first user interface off of the display is determined based on a magnitude of the first movement and a first movement proportionality factor; and concurrently sliding the second user interface onto the display in the first direction over the first user interface in accordance with the first movement while sliding the first user interface off of the display. A magnitude of the sliding of the second user interface onto the display over the first user interface is determined based on a magnitude of the first movement and a second movement proportionality factor, and the second movement proportionality factor is different from the first movement proportionality factor such that for a respective magnitude of the first movement, the magnitude of sliding the first user interface off the display is different from the magnitude of sliding the second user interface onto the display over the first user interface.

In accordance with some embodiments, an electronic device includes a display unit configured to display a first user interface, and a processing unit coupled to the display unit. The processing unit is configured to: detect a first input that includes a first movement and that corresponds to a request to replace the first user interface with a second user interface; and in response to detecting the first input: slide the first user interface off of the display unit in a first direction in accordance with the first movement, wherein a magnitude of the sliding of the first user interface off of the display unit is determined based on a magnitude of the first movement and a first movement proportionality factor; and concurrently slide the second user interface onto the display unit in the first direction over the first user interface in accordance with the first movement while sliding the first user interface off of the display unit. A magnitude of the sliding of the second user interface onto the display unit over the first user interface is determined based on a magnitude of the first movement and a second movement proportionality factor, and the second movement proportionality factor is different from the first movement proportionality factor such that for a respective magnitude of the first movement, the magnitude of sliding the first user interface off the display unit is different from the magnitude of sliding the second user interface onto the display unit over the first user interface.

In accordance with some embodiments, an electronic device includes a display, optionally a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, optionally a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display and optionally a touch-sensitive surface, cause the device to perform the operations of any of the methods referred described above. In accordance with some embodiments, an electronic device includes: a display and optionally a touch-sensitive surface, and means for performing the operations of any of the methods described above. In accordance with some embodiments, an information processing apparatus, for use in an electronic device with a display and optionally a touch-sensitive surface, includes means for performing the operations of any of the methods described above.

Thus, electronic devices with displays and optionally touch-sensitive surfaces are provided with faster, more efficient methods and interfaces navigating between user interfaces, thereby increasing the effectiveness, efficiency, and user satisfaction with such devices. Such methods and interfaces may complement or replace conventional methods for navigating between user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
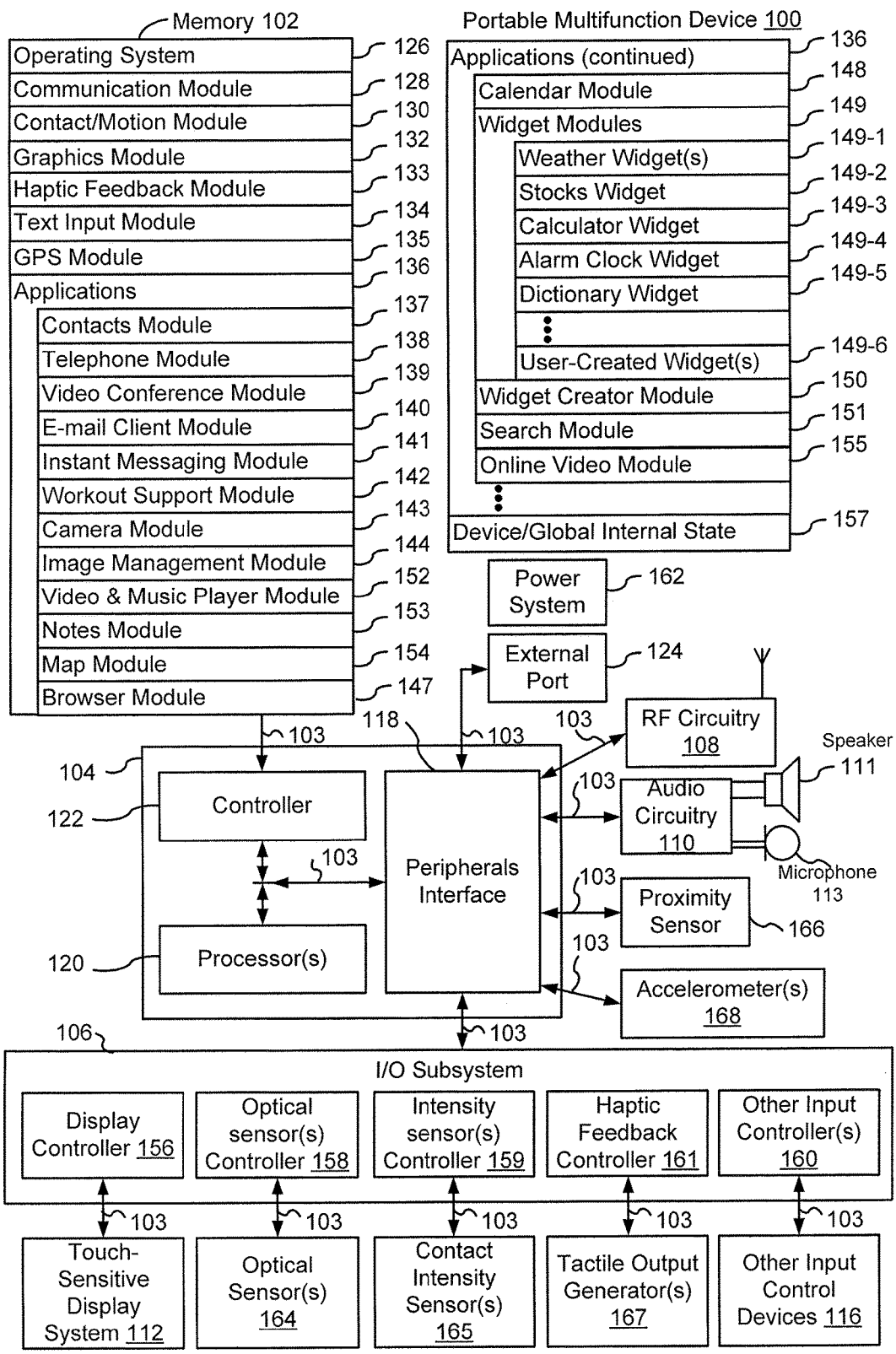
FIG. 1A is a block diagram illustrating a portable multifunction device with a touch-sensitive display in accordance with some embodiments.

Many electronic devices have graphical user interfaces, such as user interfaces for displaying content or levels in a hierarchal user interface. Prior devices often move a first user interface in a hierarchal user interface off of a display at the same rate that a second user interface in the hierarchal user interface is being moved onto the display. Alternatively, prior device do not move the first user interface at all while the second user interface in the hierarchal user interface is being moved onto the display over the first user interface. These prior types of movement do not provide context as to a direction that the user is navigating in the hierarchy of user interfaces. In contrast, for the devices described herein, the rate at which the first user interface is moved off of the display is different from the rate at which the second user interface is moved onto the display. Moving the first user interface off of the display at a rate that is different from the rate at which the second user interface is moved onto the display provides the user with intuitive visual cues as to a direction that the user is navigating in a user interface hierarchy.

Below, FIGS. 1A-1B, 2, and 3 provide a description of exemplary devices. FIGS. 4A-4B and 5A-5X illustrate exemplary user interfaces for navigating between user interfaces. FIGS. 6A-6E are flow diagrams illustrating a method of navigating between user interfaces. The user interfaces in FIGS. 5A-5X are used to illustrate the processes in FIGS. 6A-6E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan rea network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDP A), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
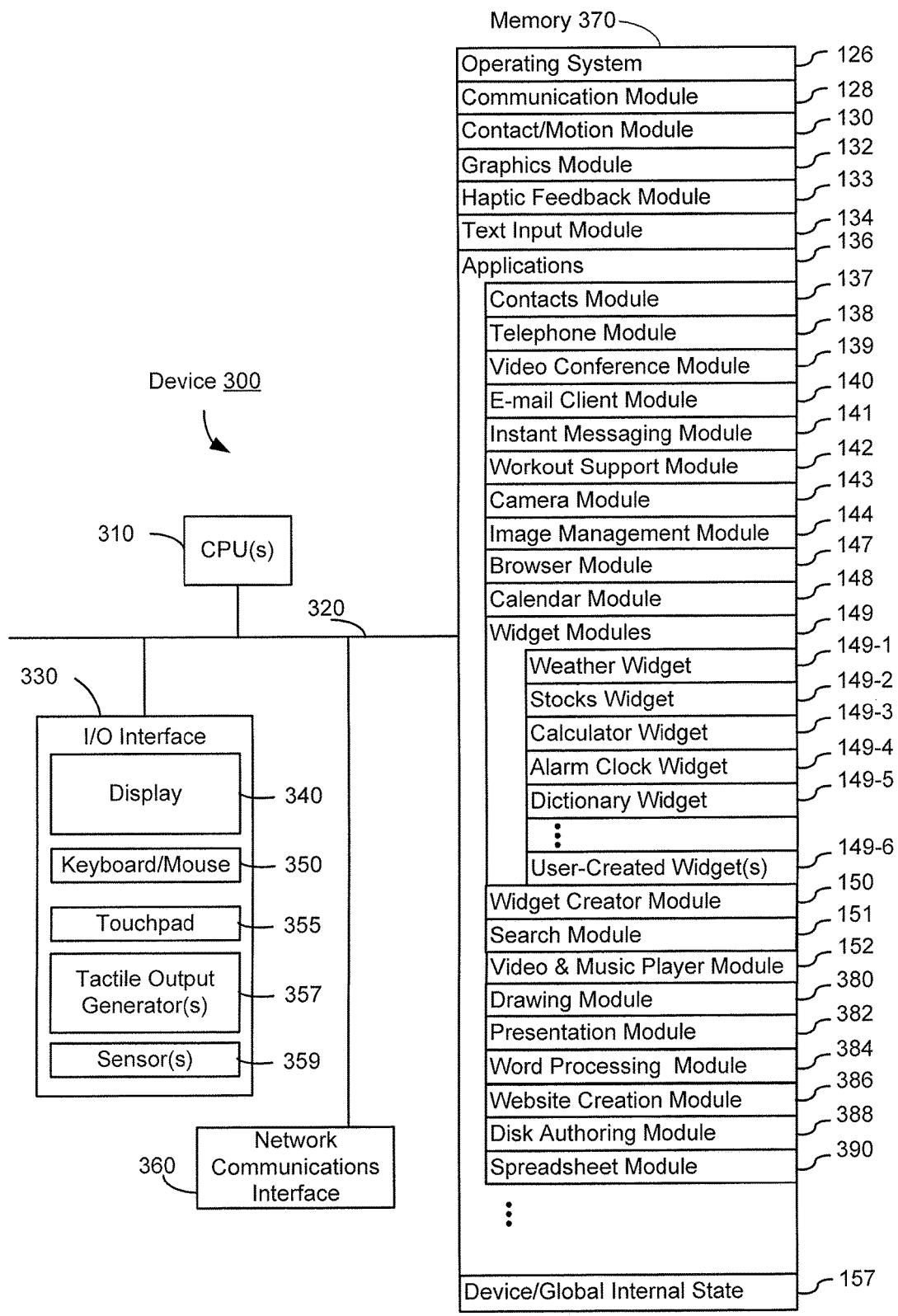
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
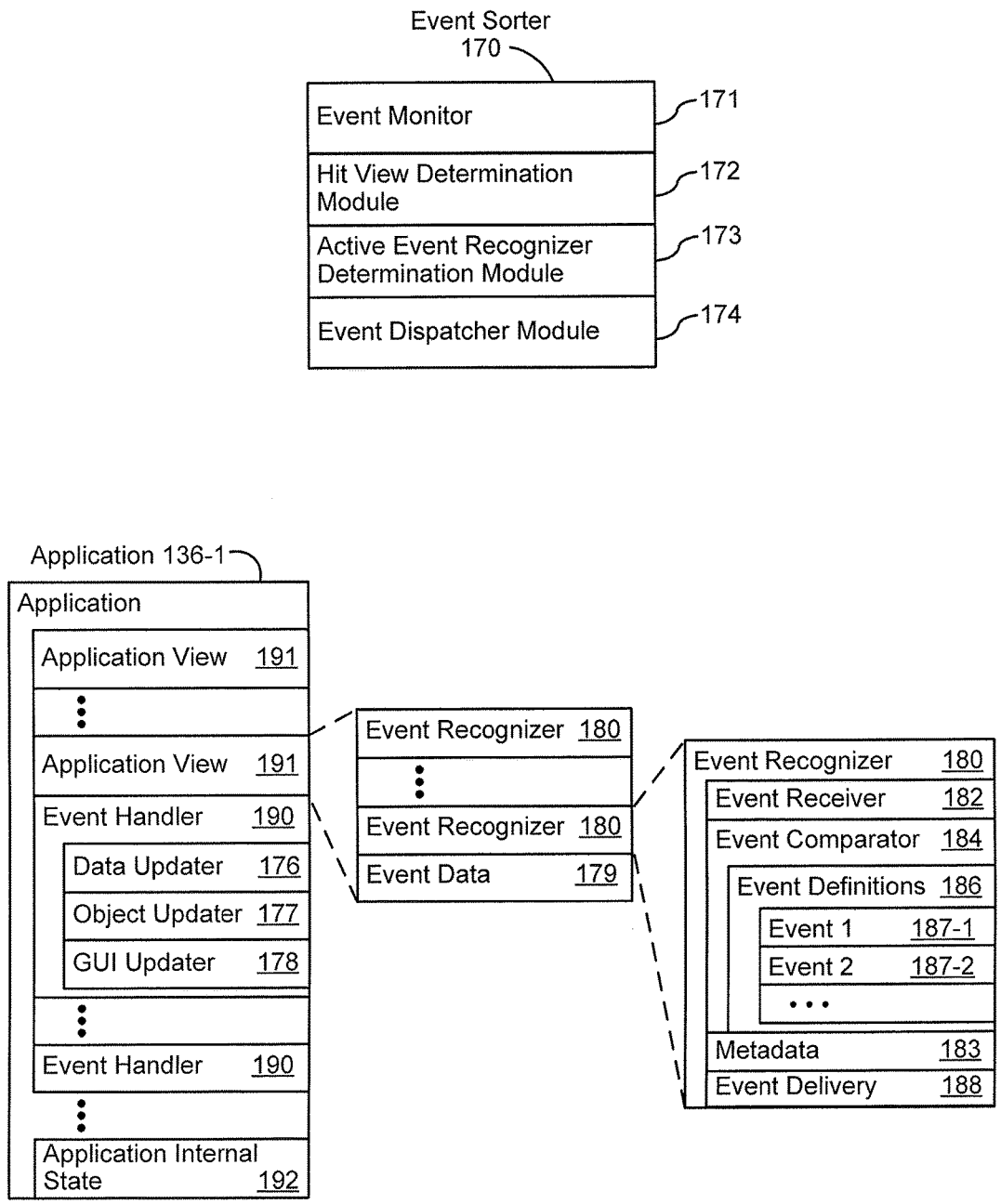
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physic allocation of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
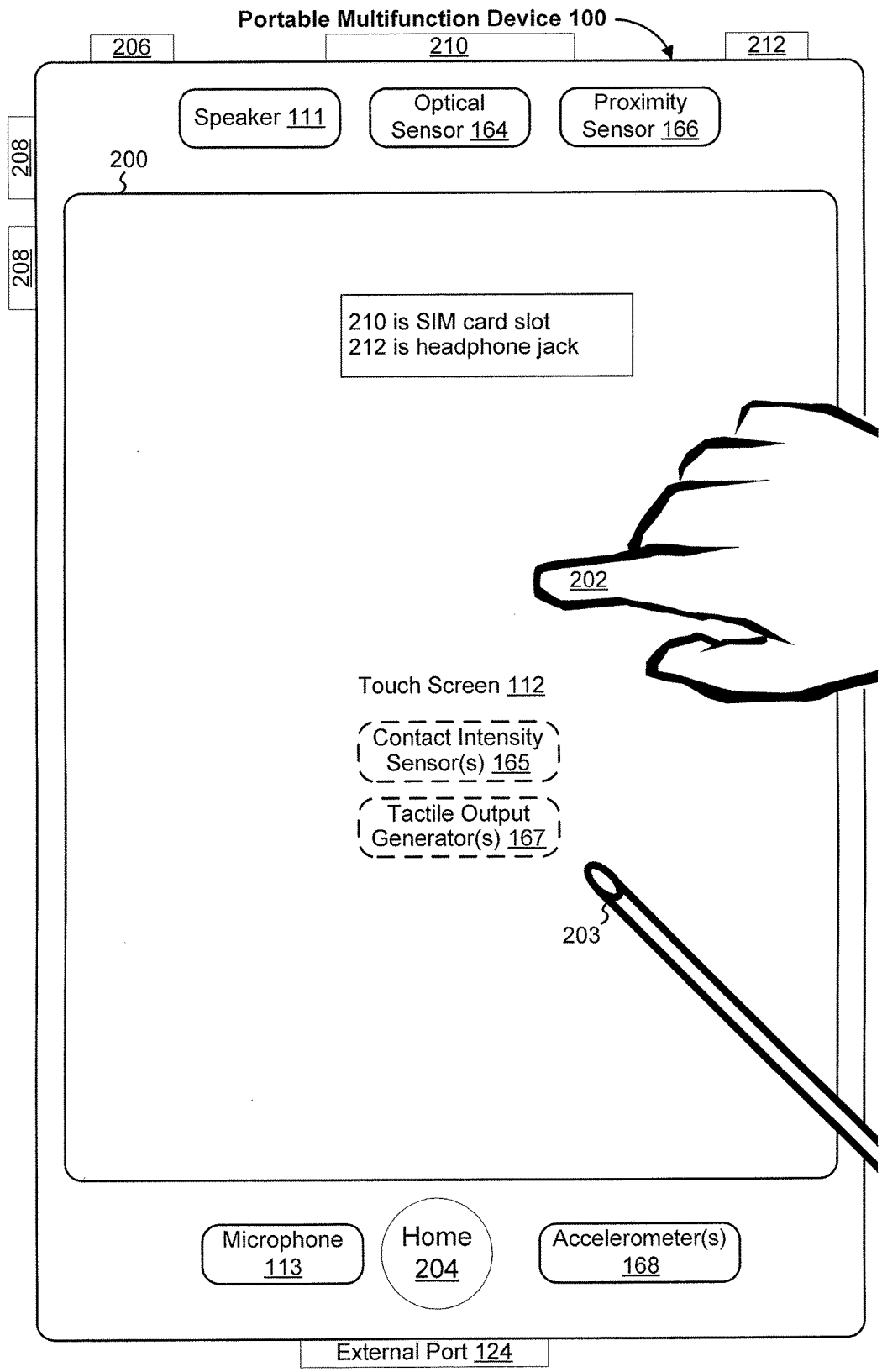
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
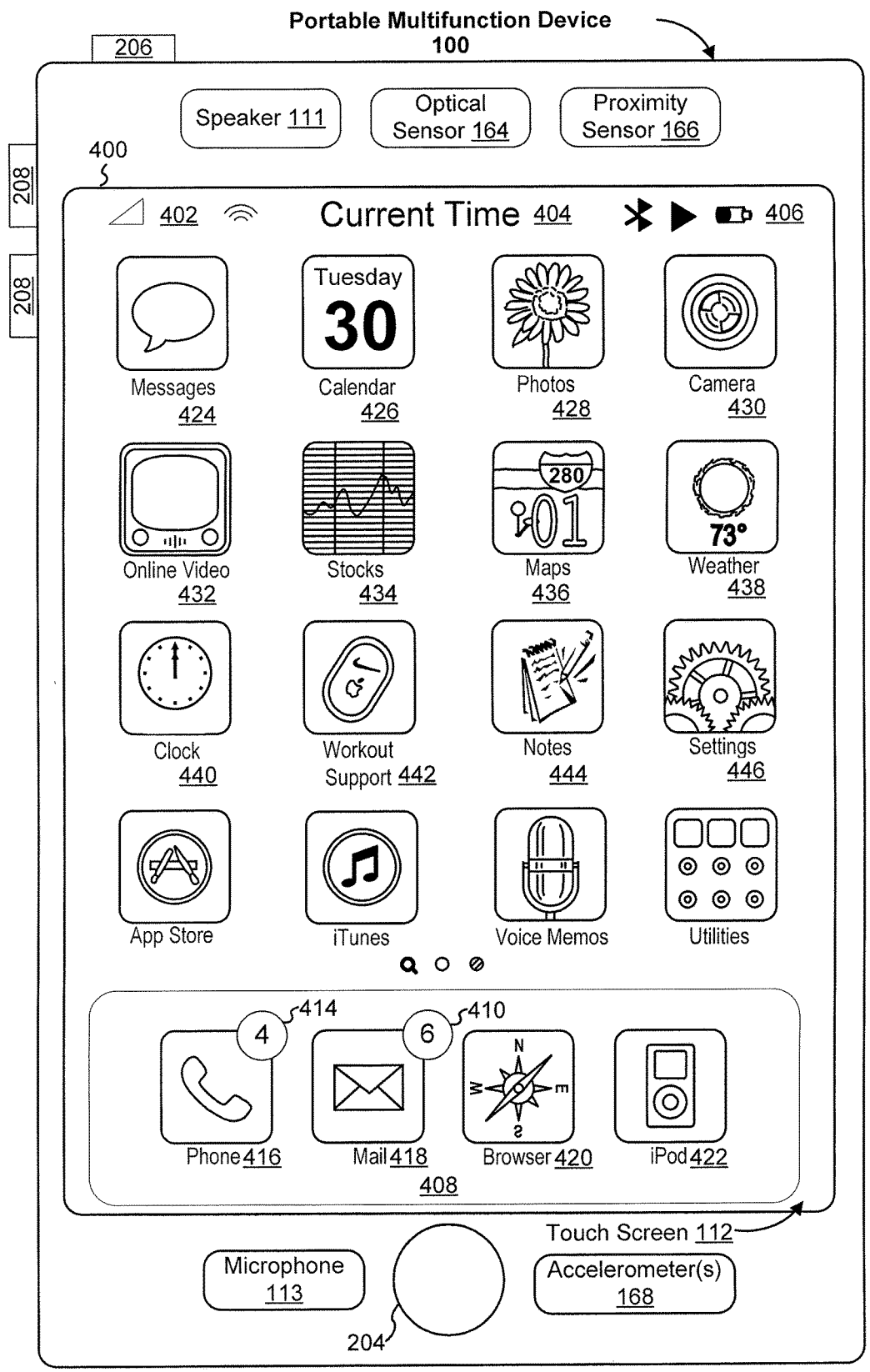
FIG. 4A illustrates an exemplary user interface for a menu of applications on a portable multifunction device in accordance with some embodiments.
Figure 5A:
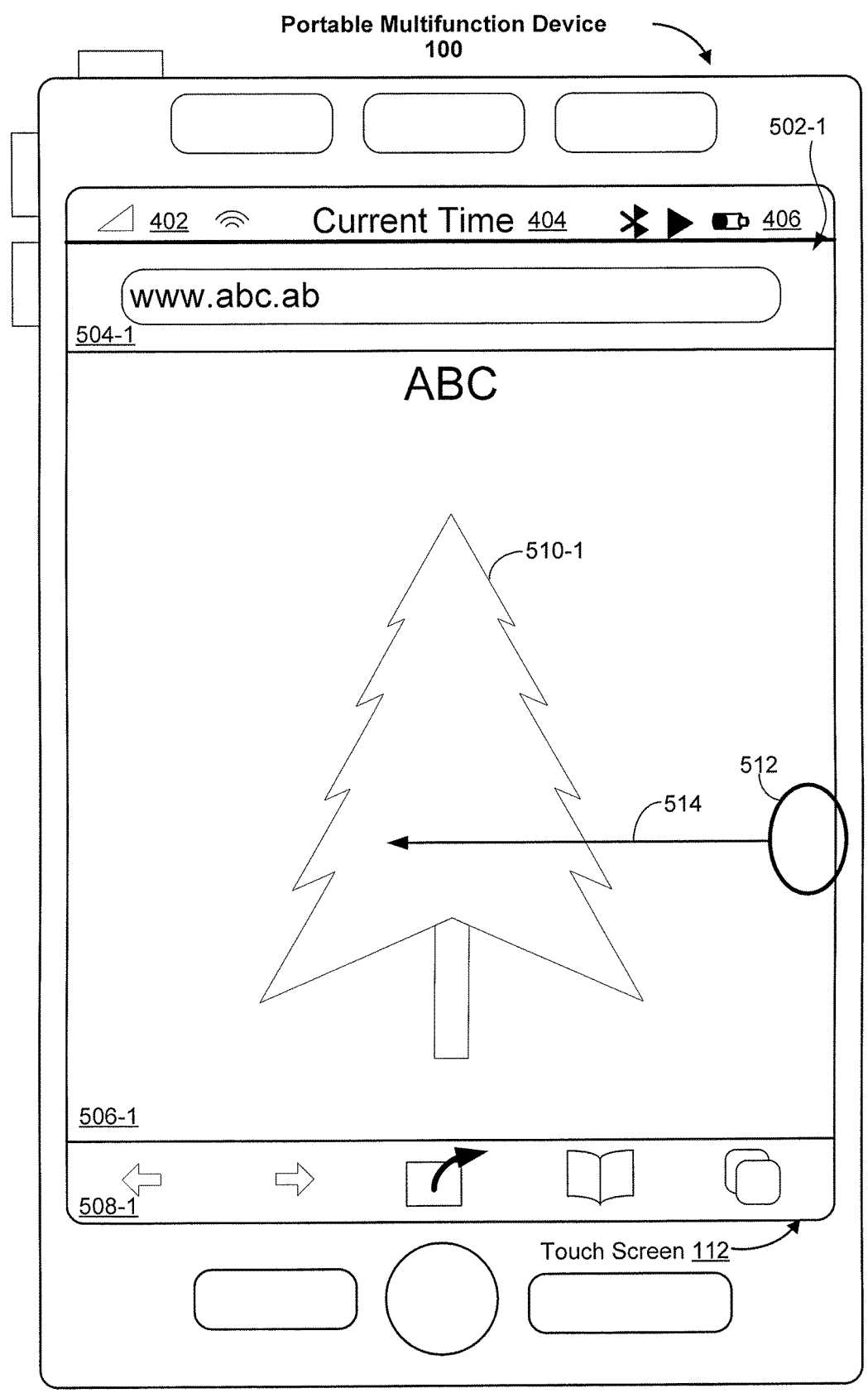
FIGS. 5A-5X illustrate exemplary user interfaces for navigating between user interfaces in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and
Icons for other applications, such as:
 Icon 424 for IM module 141, labeled "Text;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video"
 Icon 434 for stocks widget 149-2, labeled "Stocks;"
 Icon 436 for map module 154, labeled "Map;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
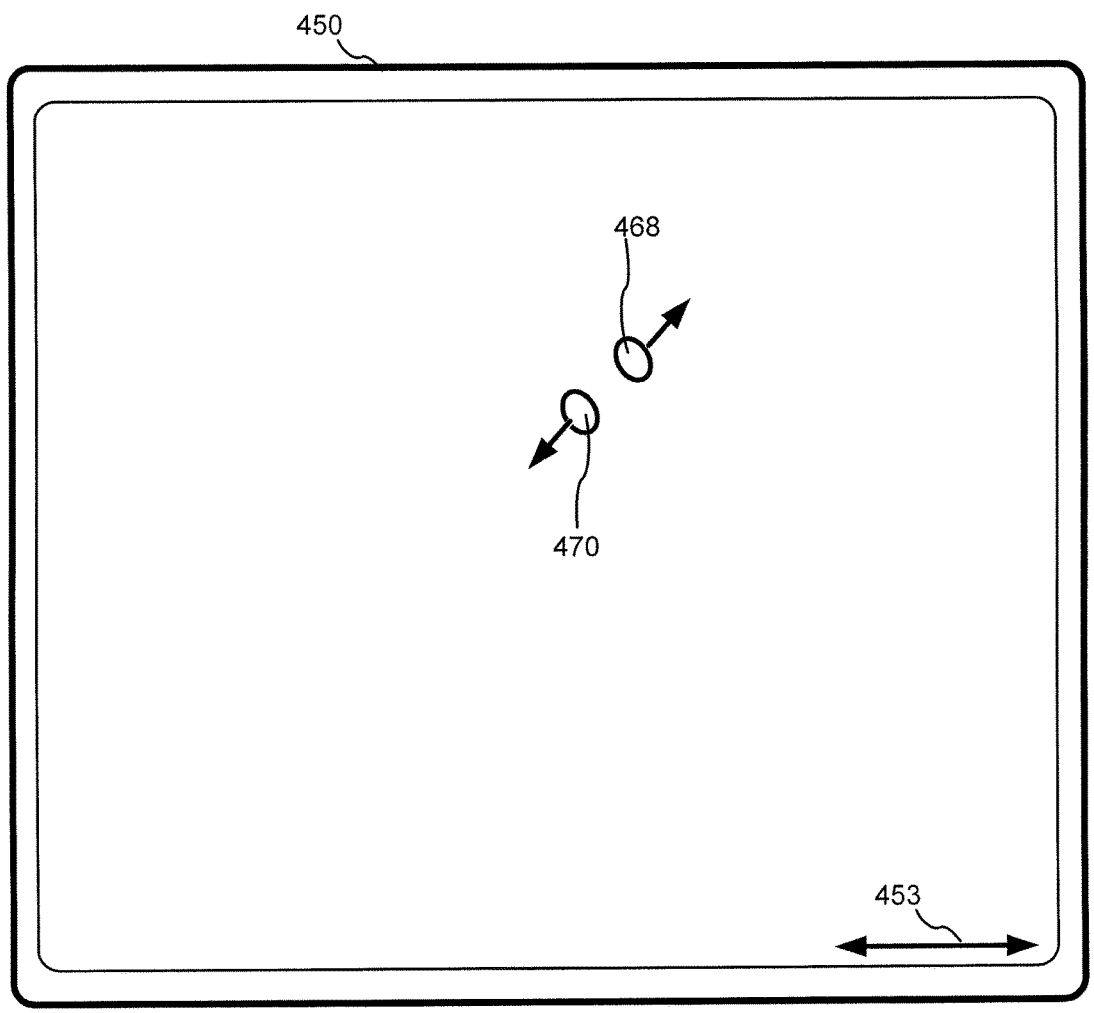
FIG. 4B illustrates an exemplary user interface for a multifunction device with a touch-sensitive surface that is separate from the display in accordance with some embodiments.
Figure 4B:
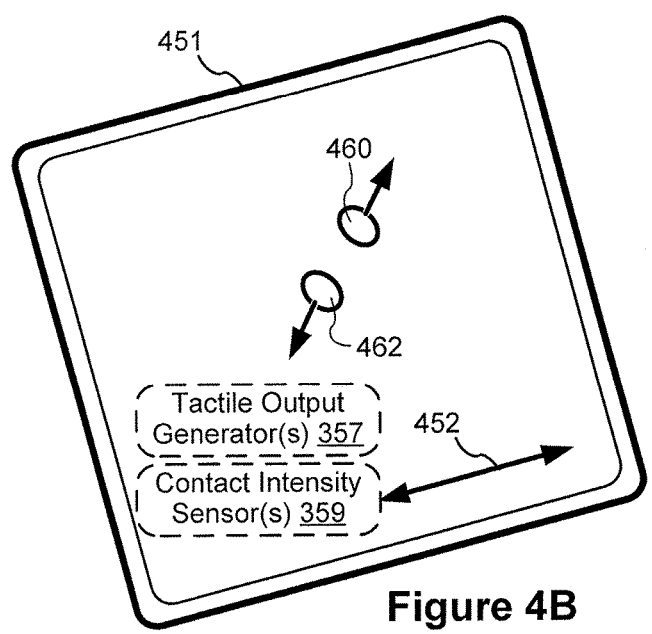

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5X illustrate exemplary user interfaces for navigating between user interfaces in accordance with some embodiments. The user interfaces in these figures are used to illustrate the processes described below, including the processes in FIGS. 6A-6E.

FIG. 5A shows user interface 502 displayed on touch screen 112 of device 100. User interface 502 is a user interface for an application (e.g., any of the modules or widgets described above with reference to FIG. 1A, 3, or 4A). For example, user interface 502 in FIG. 5A is a user interface for a web browser application.

User interface 502 includes input region 504, in which a Universal Resource Locator (URL) or one or more search terms can be input by the user, content 506 (e.g., a web page) corresponding to the URL or search terms input into input region 504, and control region 508. In FIG. 5A, user interface 502-1 includes content 506-1, input region 504-1 (which includes the URL for content 506-1), and control region 508-1. Content 506-1 includes graphical object (e.g., an image) 510-1 that, in this example, is horizontally centered within content 506-1. Control region 508-1 includes one or more controls for navigating content and other functions (e.g., backward and forward controls, content sharing control, bookmarks and history control(s), new window/tab control).

Figure 5B:
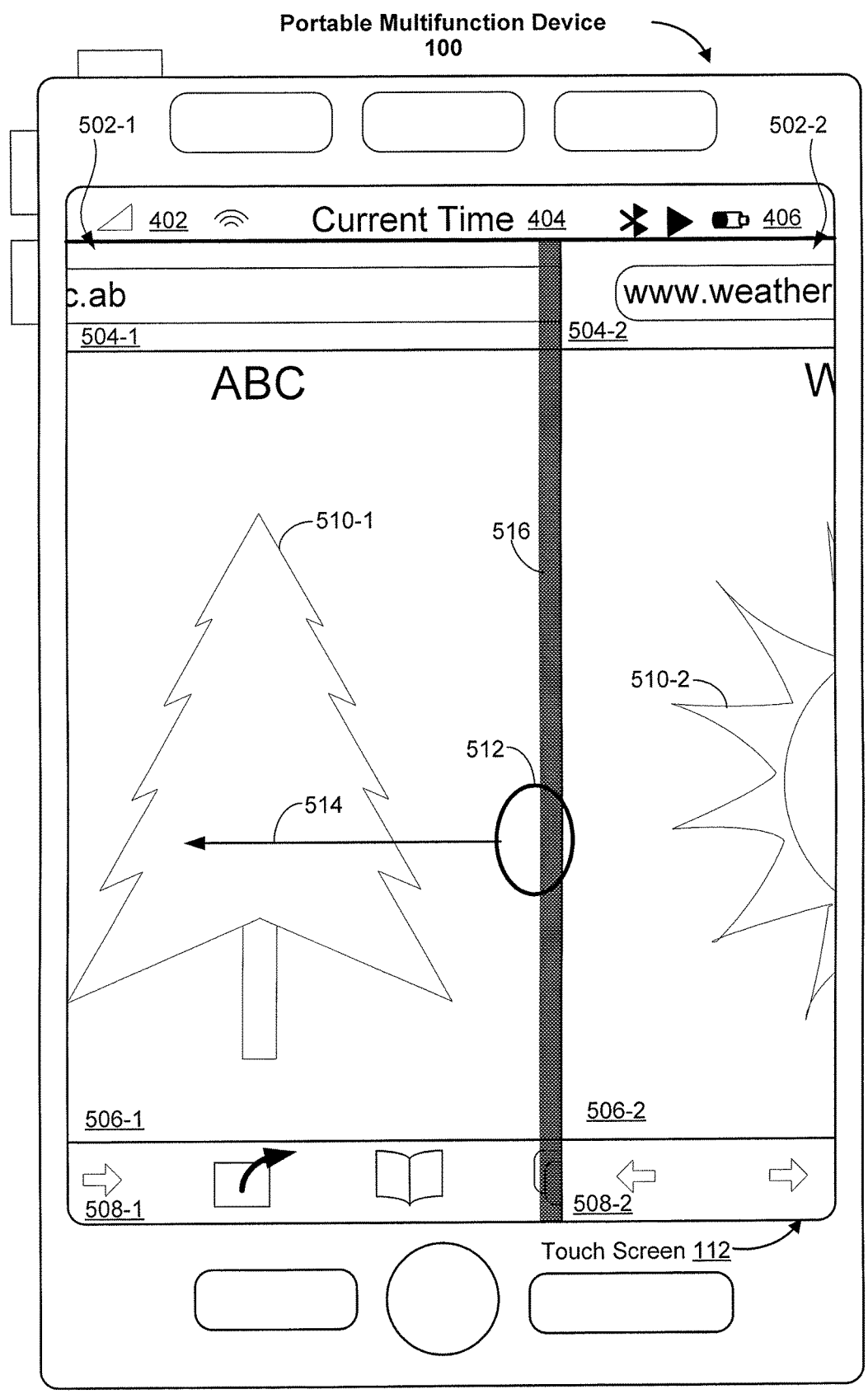
Figure 5C:
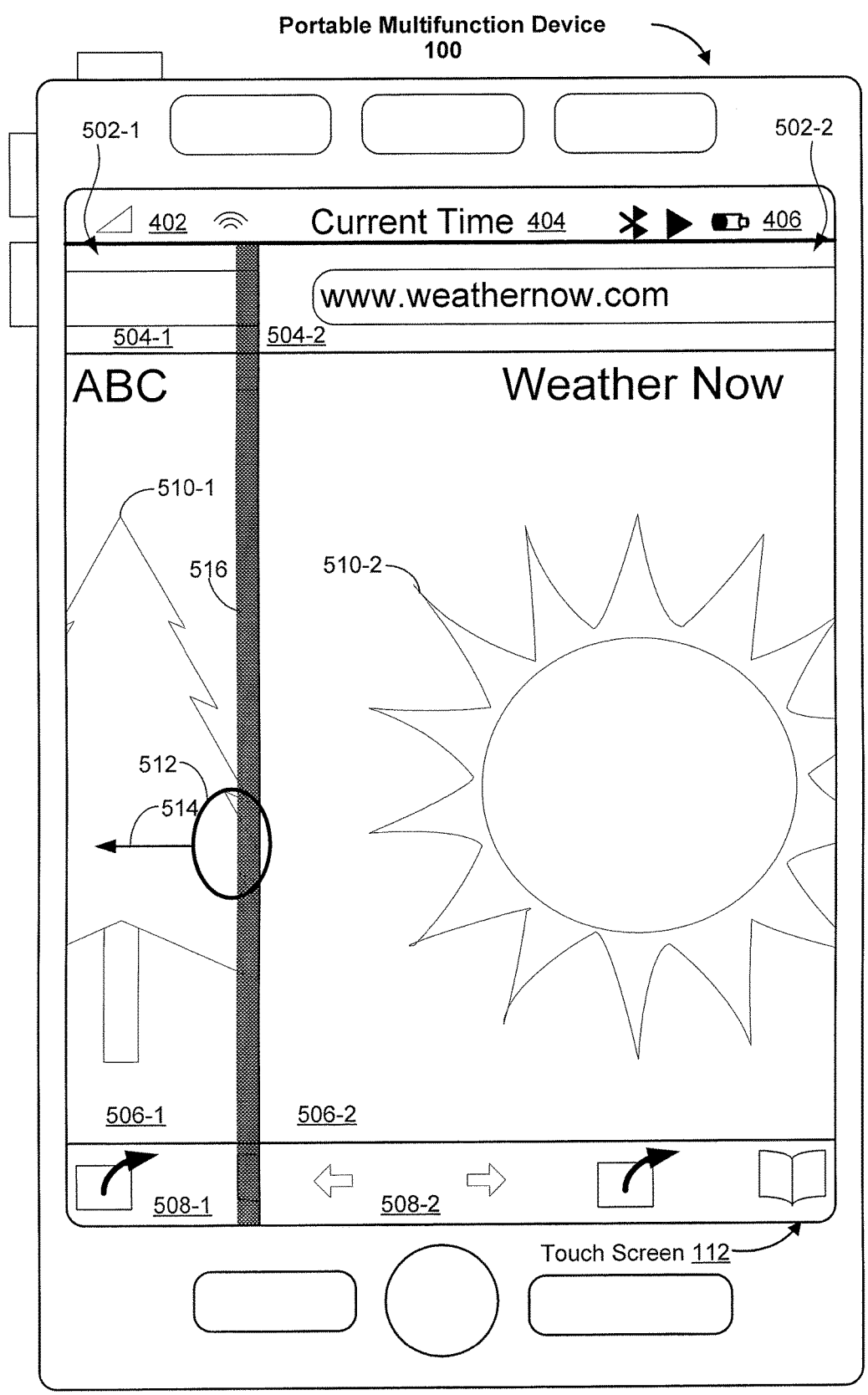
Figure 5D:
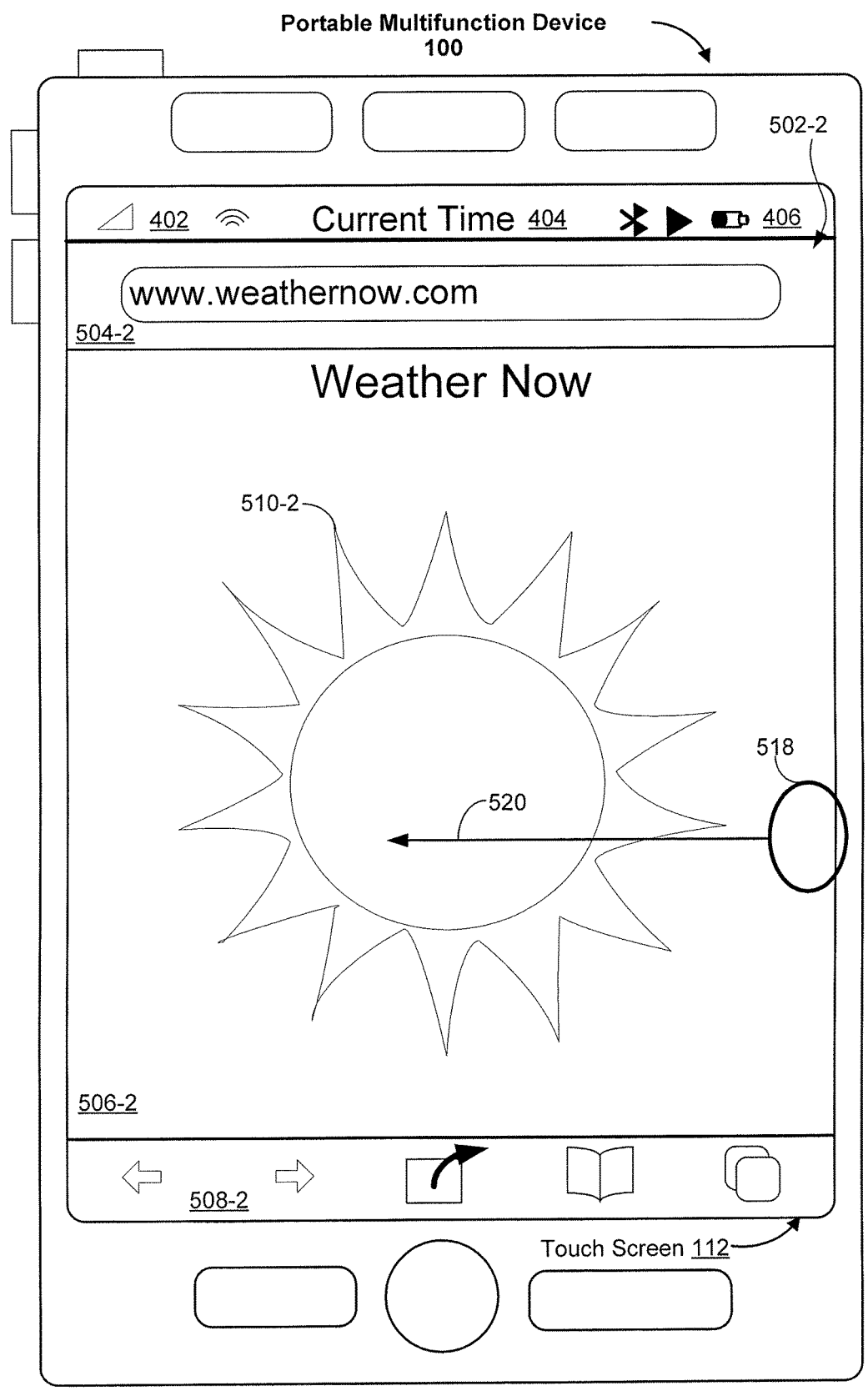

Device 100 detects a gesture that includes contact 512 moving in direction 514. In response to detecting the gesture, device 100 moves (e.g., slides) user interface 502-1 off of an edge (e.g., the left edge) of touch screen 112 in direction 514, and moves (e.g., slides) user interface 502-2 in direction 514 onto touch screen 112 from the opposite edge (e.g., the right edge), in accordance with the movement of contact 512, as shown in FIGS. 5B-5D. User interface 502-2 includes content 506-2, input region 504-2 (which includes the URL for content 506-2), and control region 508-2. Content 506-2 includes graphical object 510-2 that, in this example, is horizontally centered within content 506-2.

User interfaces 502-1 and 502-2 are successive user interfaces in a sequence of user interfaces. In some embodiments, the sequence of user interfaces corresponds to a web browser history; user interfaces 502-1 and 502-2 correspond to web pages in a web browser history (e.g., content 506-1 and 506-2 are successive web pages within the web browser history, with content 506-2 being more recently visited than content 506-1). Thus, sliding one user interface off and sliding the other user interface on can serve as navigation between web pages within the web browser history.

User interfaces 502 have a z-order along an axis perpendicular to the display. As shown in the figures, user interface 502-2 is above user interface 502-1 in the z-order. In some embodiments, older webpages are "higher" in the z-order. In some embodiments, older webpages are "lower" in the z-order.

User interfaces 502-1 and 502-2 slide at different speeds. The speed of the sliding for each are determined based on a respective proportionality factor that specifies a ratio of the amount (e.g., magnitude) of sliding of the user interface to the amount (e.g., magnitude) of movement of the contact (e.g., contact 512) in the detected gesture. The proportionality factors are different for user interfaces 502-1 and 502-2. As shown in FIGS. 5B-5D, the proportionality factor for user interface 502-2 is higher; user interface slides more per unit of contact movement than user interface 502-1. As described above, user interfaces 502 have a the z-order. Thus, user interface 502-2 slides faster than user interface 502-1, and appears to slide over user interface 502-1. In some embodiments, visual indication of user interface 502-2 sliding over user interface 502-1, such as drop shadow 516, is displayed.

Further, the difference in sliding speed is demonstrated by the positions of graphical objects 510-1 and 510-2 on touch screen 112. In FIGS. 5B-5C, graphical object 510-2 catches up to graphical object 510-1, position-wise.

In some embodiments, for the user interface that is sliding off, the center portion of that user interface is the last portion to be displayed before the user interface that is sliding on overtakes the user interface that is sliding off. For example, as shown in FIGS. 5B-5D, user interface 502-1 is sliding more slowly than user interface 502-2, and thus by the time user interface 502-2 is about to overtake user interface 502-1, just the center portion of user interface 502-1 (represented by horizontally centered graphical object 510-1) is still visible but the side portions are not (one side portion having slid off touch screen 112 and the other side portion being obscured/covered by user interface 502-2).

In some embodiments, in the web browser history example, the proportionality factor for the user interface corresponding to the more recently visited content is higher than the user interface corresponding to the less recently visited content; the more recently visited content slides (on or off) faster than the less recently visited content. As shown in the figures, user interface 502-2 slides faster than user interface 502-1; content 506-2 was more recently visited than content 506-1.

In some embodiments, the proportionality factor for the faster sliding user interface is 1:1 (i.e., the user interface slides on at the same speed as the contact moves across touch screen 112 so that for every 10 pixels moved by the contact to the right, the second user interface moves by 10 pixels to the right), and the proportionality factor for the slower sliding user interface is less than 1:1 (e.g., 0.5:1 so that for every 10 pixels moved by the contact to the right, the first user interface moves by 5 pixels to the right). Thus, for example, the proportionality factor for user interface 502-2 is 1:1, and the proportionality factor for user interface 502-1 is less than 1:1 (e.g., 0.5:1).

Figure 5E:
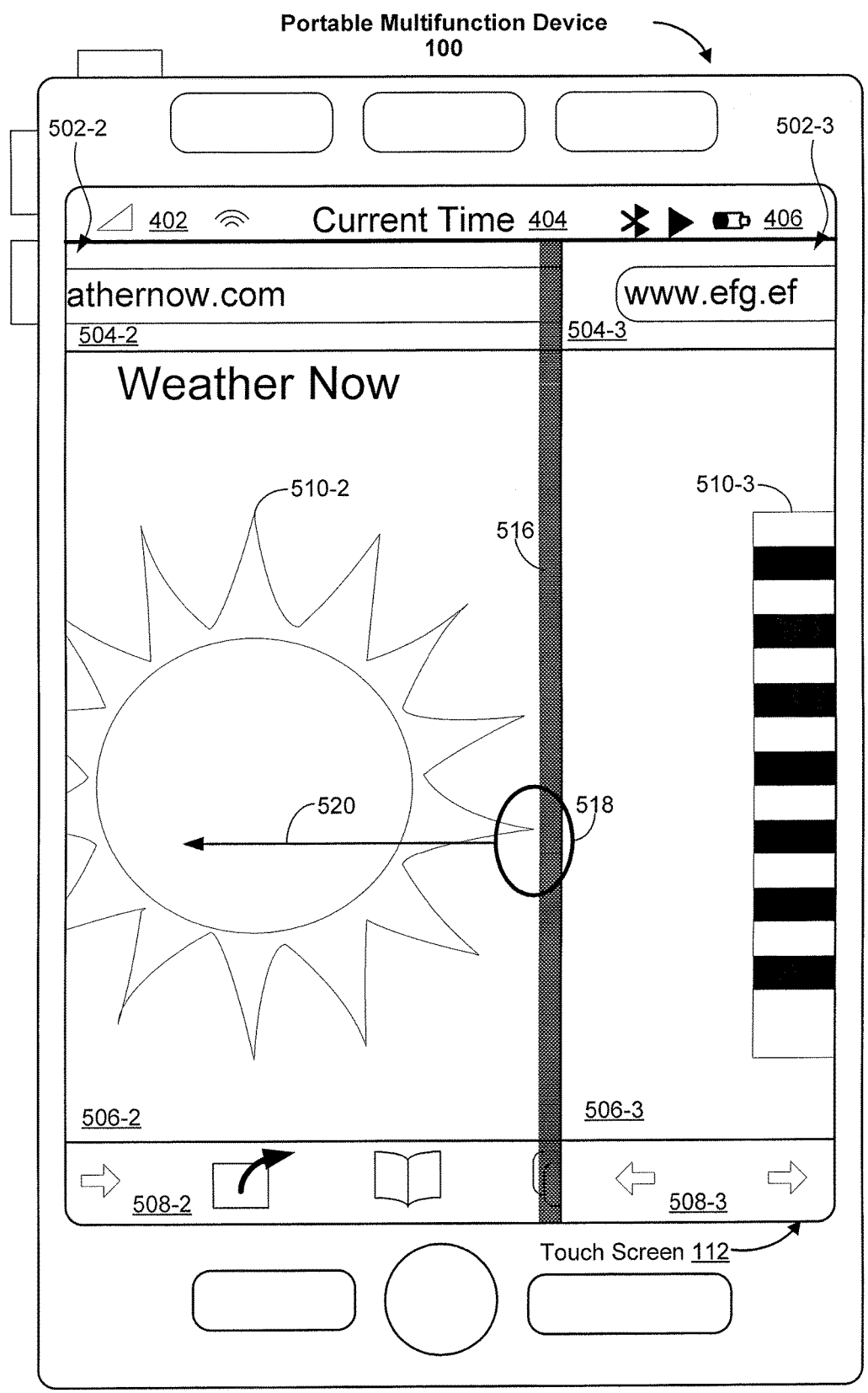
Figure 5F:
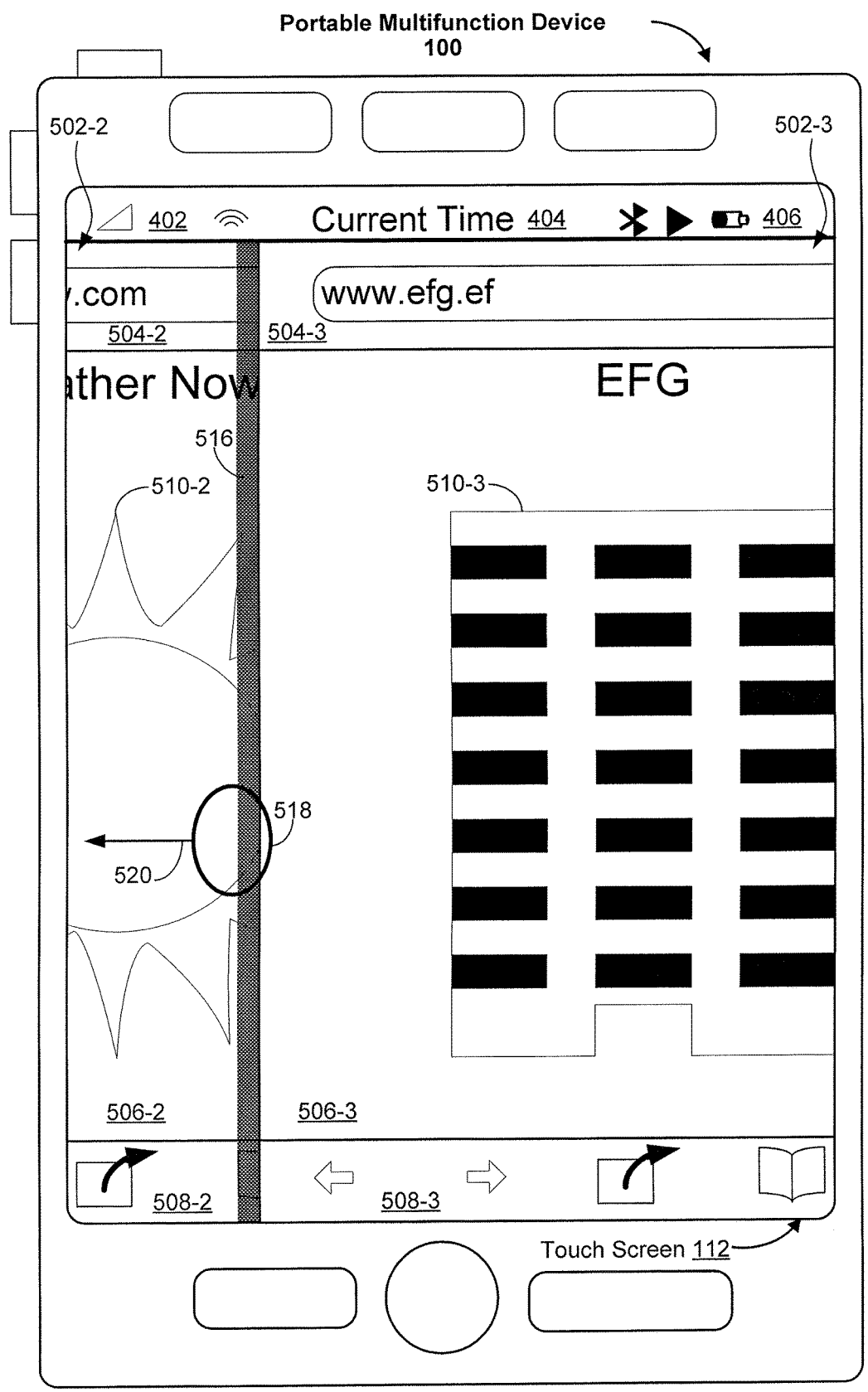
Figure 5G:
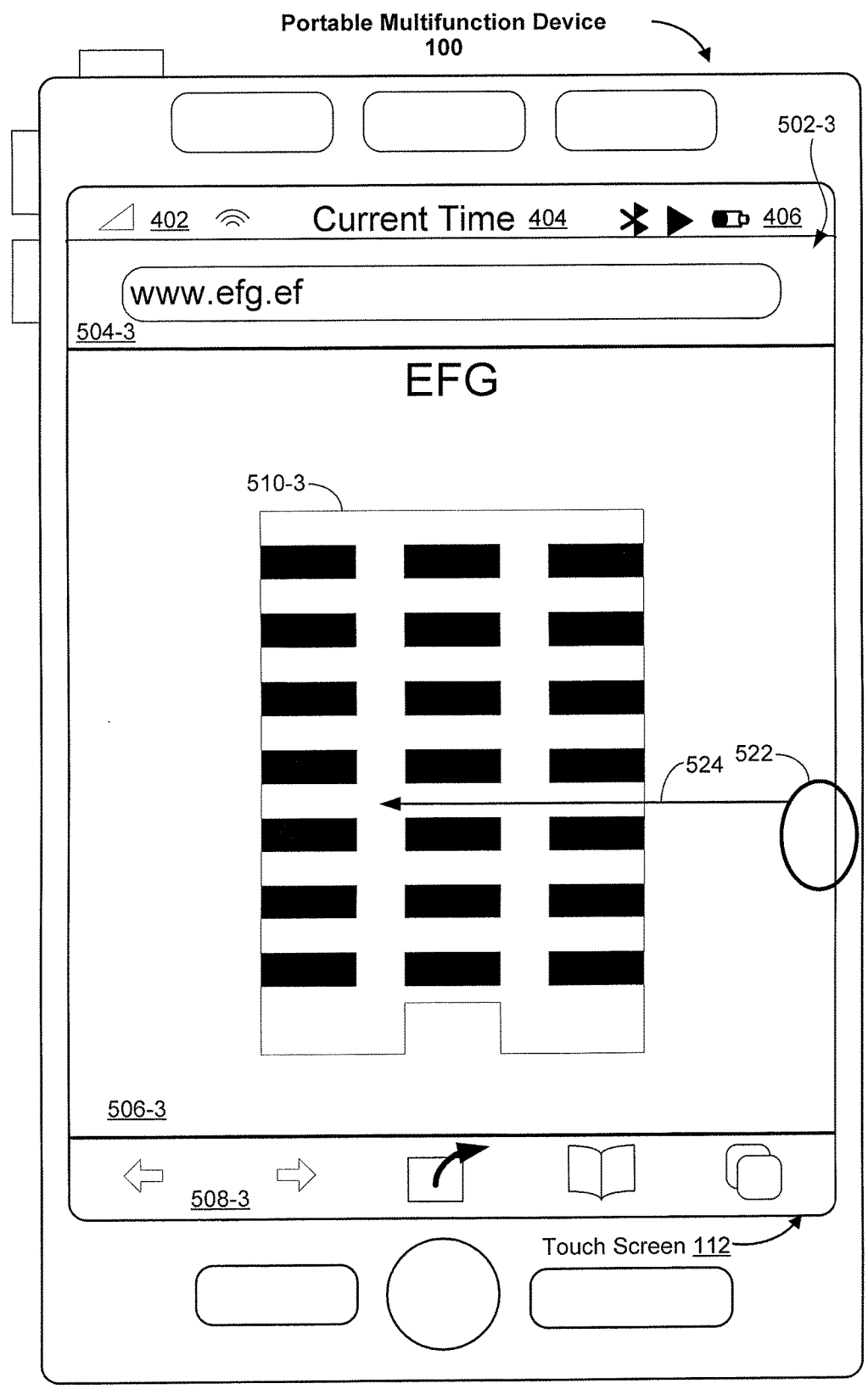

FIG. 5D shows user interface 502-2, having slid on completely onto touch screen 112 and user interface 502-1 completely slid off of touch screen 112, displayed on touch screen 112. Device 100 detects a gesture that includes contact 518 moving in direction 520, which is the same direction as direction 514. In response to detecting the gesture, device 100 slides user interface 502-2 off of an edge of touch screen 112 in direction 520, and slides user interface 502-3 in direction 520 onto touch screen 112 from the opposite edge of touch screen 112, in accordance with the movement of contact 518, as shown in FIGS. 5E-5G. User interface 502-3 includes content 506-3, input region 504-3 (which includes the URL for content 506-3), and control region 508-3. Content 506-3 includes graphical object 510-3 that, in this example, is horizontally centered within content 506-3. User interface 502-3 is higher in the z-order than user interface 502-2 (and thus also higher than user interface 502-1), and corresponds to content 506-3 that is the most recently visited content in the web browser history (and thus more recently visited then content 506-2 or 506-1).

As with user interface 502-2 sliding onto touch screen 112 faster than user interface 502-1 sliding off of touch screen 112, user interface 503-3 slides on faster than, and over, user interface 502-2, in accordance with different proportionality factors for the two, as shown in FIGS. 5E-5G. For example, user interface 502-3 slides on with a proportionality factor of 1:1 and user interface 502-2 slides off with a smaller proportionality factor (e.g., 0.5:1). The sliding behaviors of user interfaces 502-3 and 502-2 in FIGS. 5D-5F are similar to the sliding behaviors of user interfaces 502-2 and 502-1 in FIGS. 5A-5D, and thus for sake of brevity the details are not repeated here.

Figure 5H:
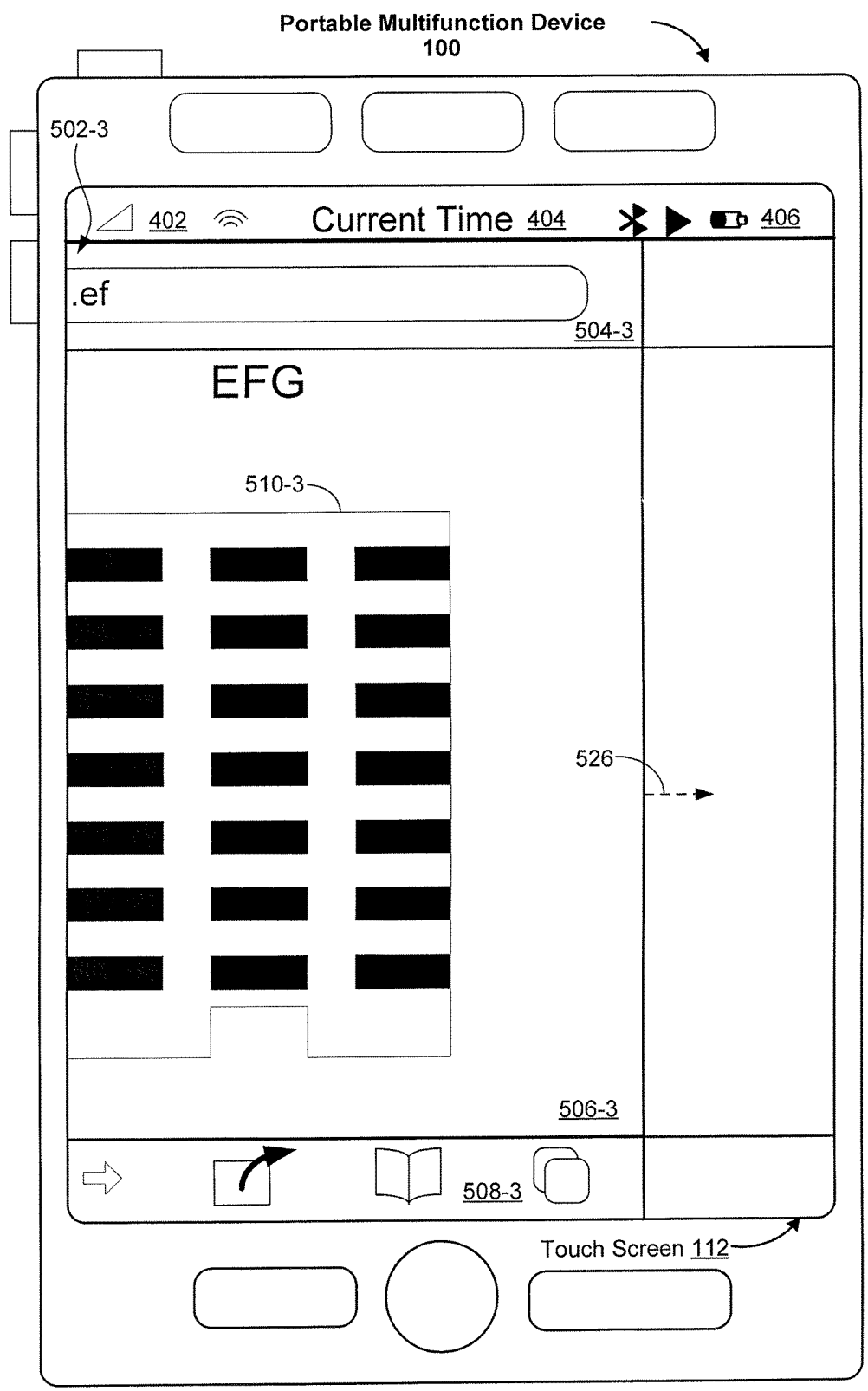

FIG. 5G shows user interface 502-3, having slid on completely onto touch screen 112 and user interface 502-2 completely slid off of touch screen 112, displayed on touch screen 112. Device 100 detects a gesture that includes contact 522 moving in direction 524, which is the same direction as directions 514 and 520. In response to detecting the gesture, device 100 slides user interface 502-3 off of an edge of touch screen 112 in direction 524 in accordance with the movement of contact 522, as shown in FIG. 5H. However, because user interface 502-3 corresponds to the most recently viewed content 506-3 in the web browser history, user interface 502-3 corresponds to an end in the sequence of user interfaces. Thus, user interface 502-3 slides away from an edge (e.g., the right edge) of touch screen 112 in accordance with the movement of contact 522, but does not completely slide off touch screen 112, as there is no user interface in the sequence to replace user interface 502-3 on touch screen 112.

Figure 5I:
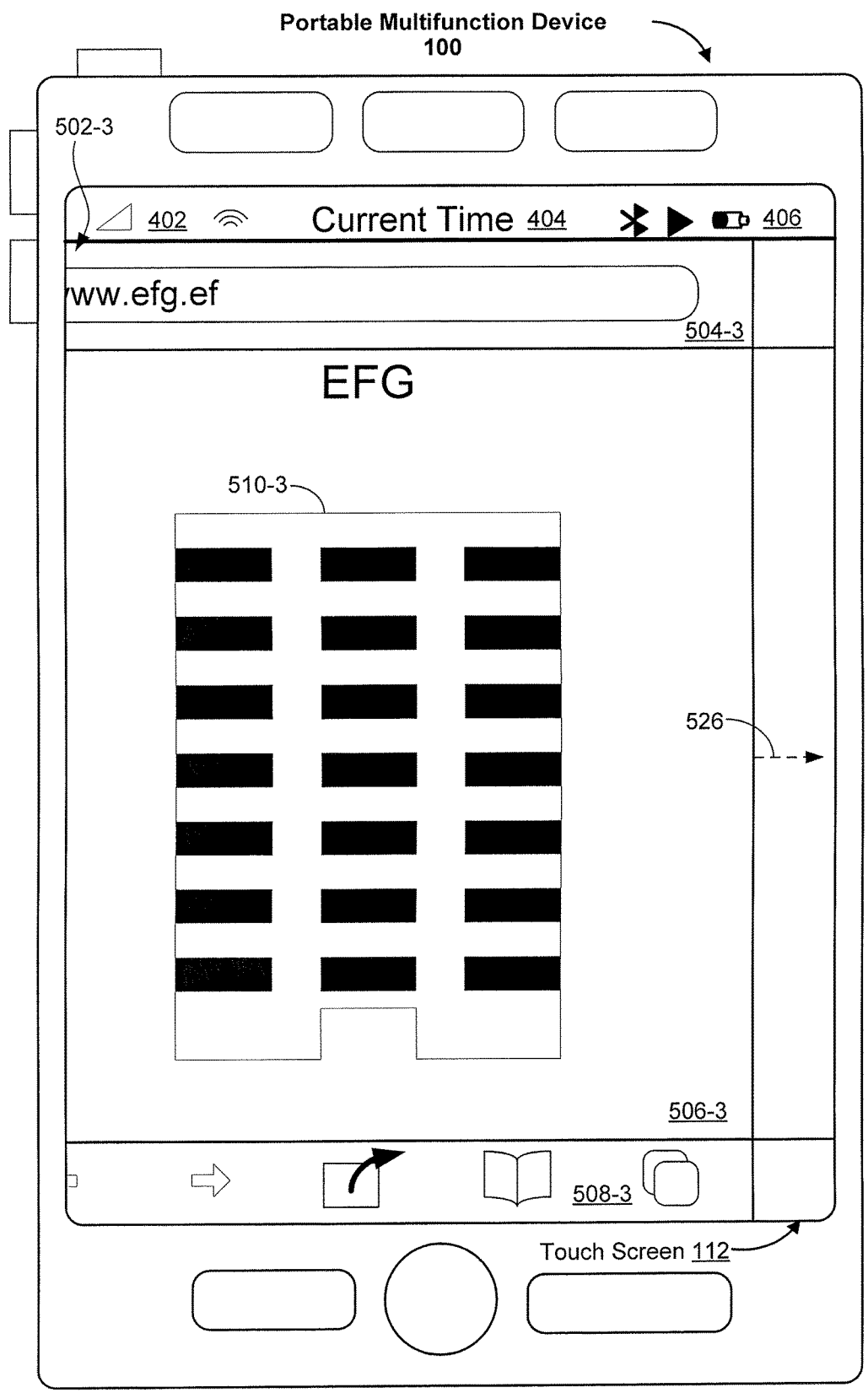
Figure 5J:
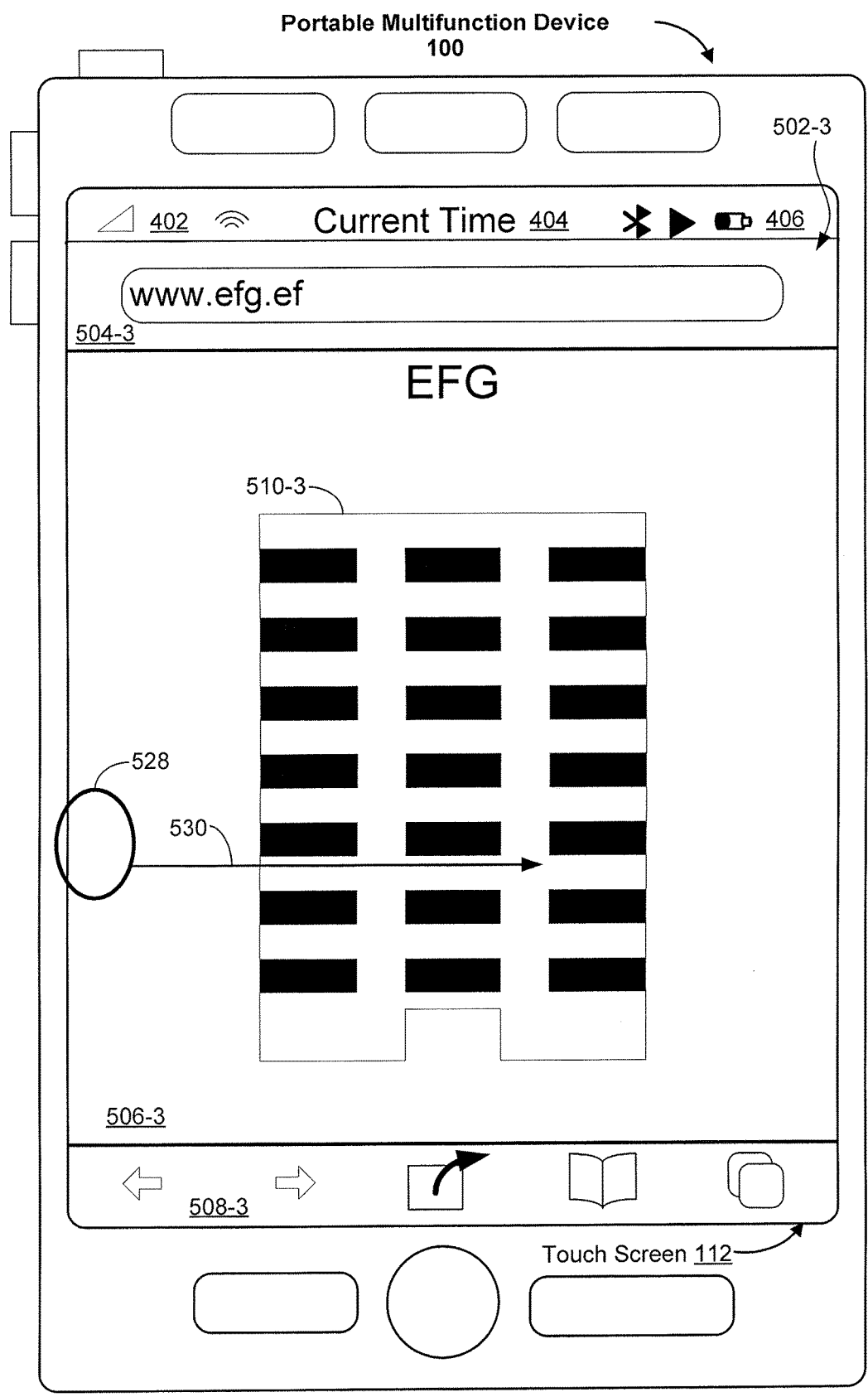

FIG. 5H shows user interface 502-3 displayed away from the right edge of touch screen 112 so that an area beyond user interface 502-3 is displayed on touch screen 112, having slid away from the right edge in accordance with the movement of contact 522. FIG. 5H also shows device 100 detecting the end of the gesture with contact 522; device 100 detects a lift-off of contact 522 from touch screen 112, ending the gesture. In response to detecting the end of the gesture, user interface 502-3 moves in direction 526, opposite of direction 524, toward the right edge (e.g., back to the position that it was in on touch screen 112 before sliding away from the right edge in response to the movement of contact 522), as shown in FIG. 5H-5J. Thus, because user interface 502-3 corresponds to an end of the content sequence, user interface 502-3 slides away from the right edge of touch screen 112 but does not completely slide off, and returns to its position before the sliding (e.g., a rubber-band effect) when the end of the gesture is detected.

FIG. 5J shows user interface 502-3 displayed on touch screen 112. Device 100 detects a gesture that includes contact 528 moving in direction 530, which is the opposite direction of directions 514 and 520. In response to detecting the gesture, device 100 slides user interface 502-3 off of an edge (the right edge) of touch screen 112 in direction 530, and slides user interface 502-2 in direction 530 onto touch screen 112 from the opposite edge (e.g., the left edge) of touch screen 112, in accordance with the movement of contact 528, as shown in FIGS. 5K-5M.

Figure 5K:
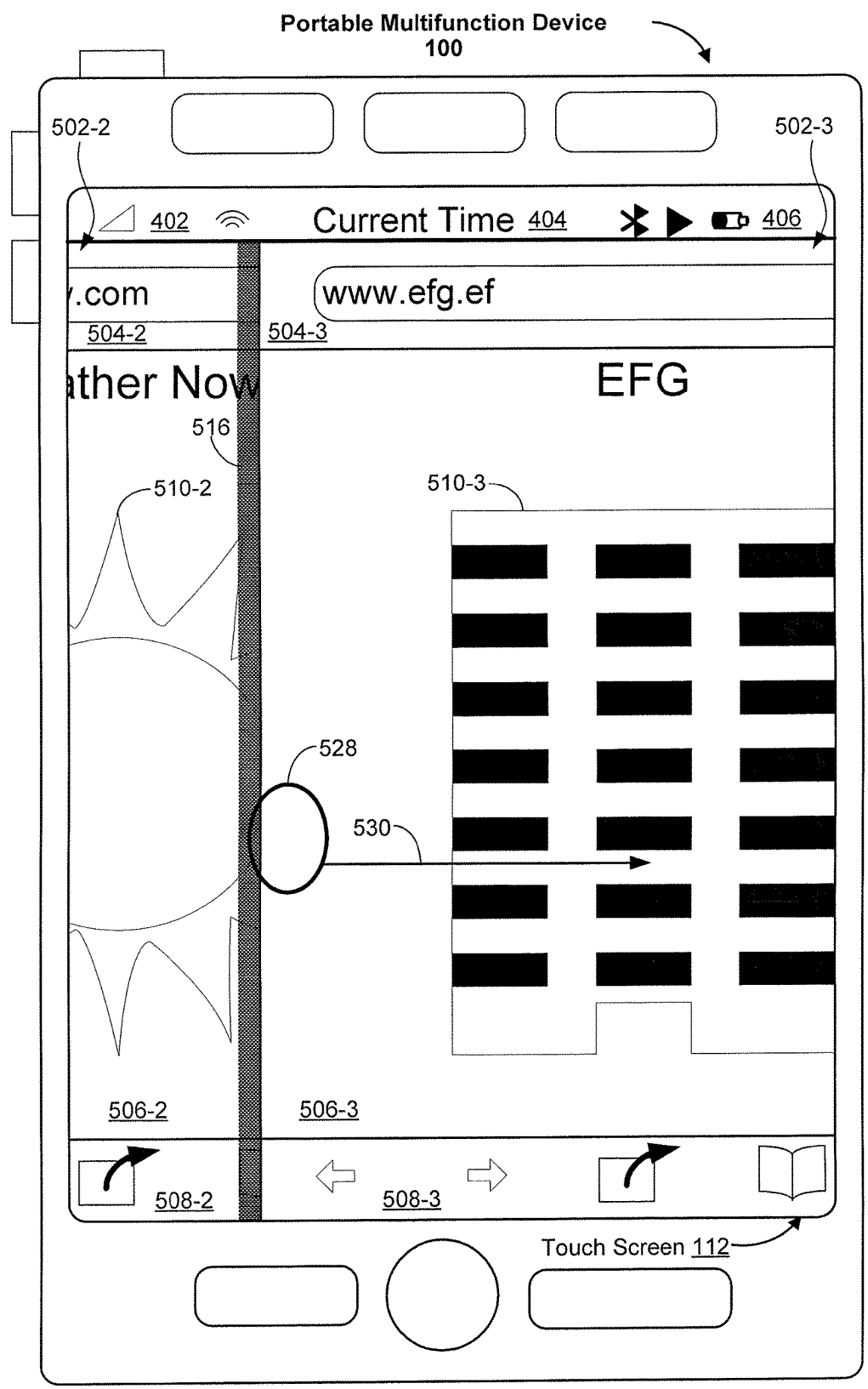
Figure 5L:
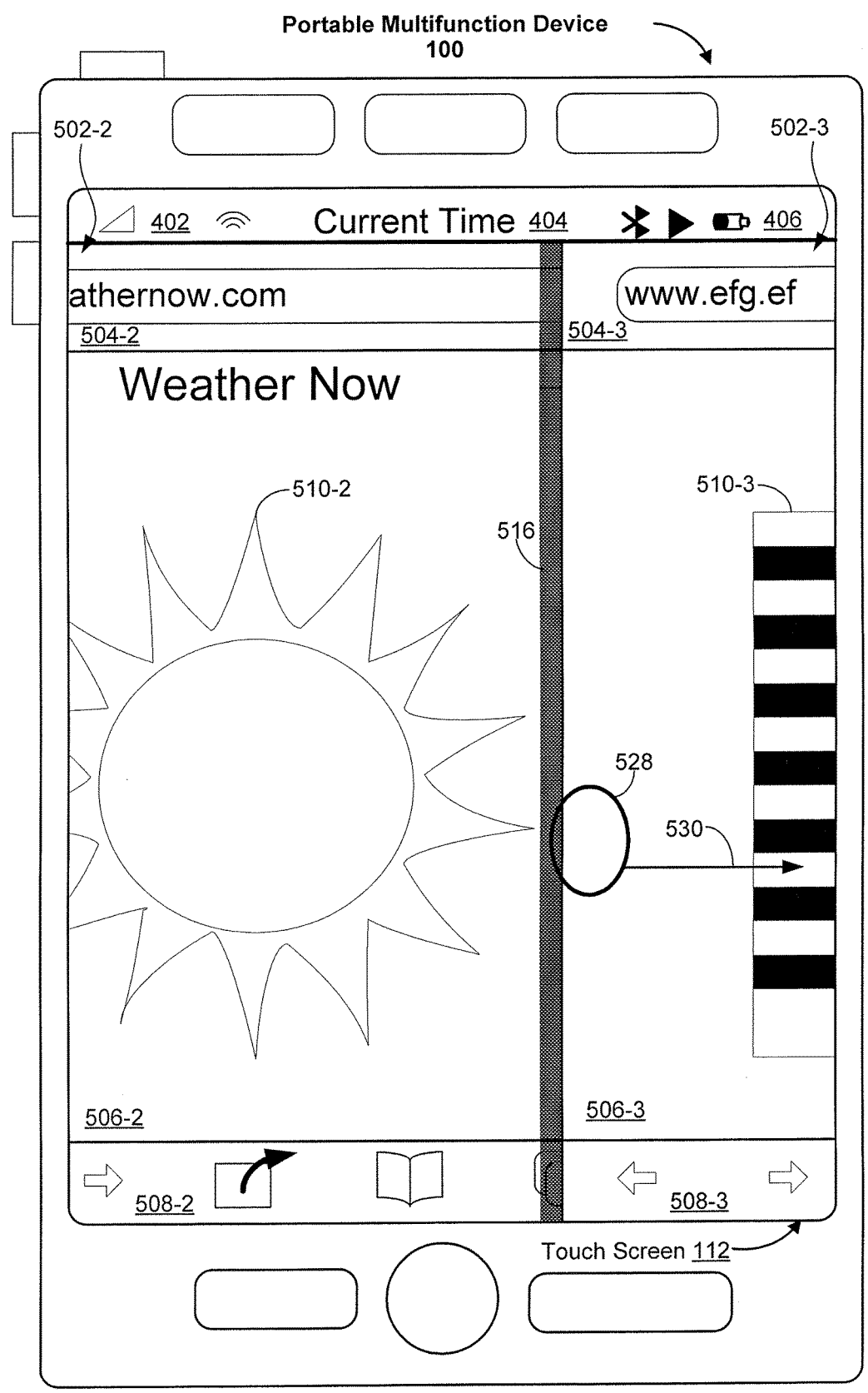
Figure 5M:
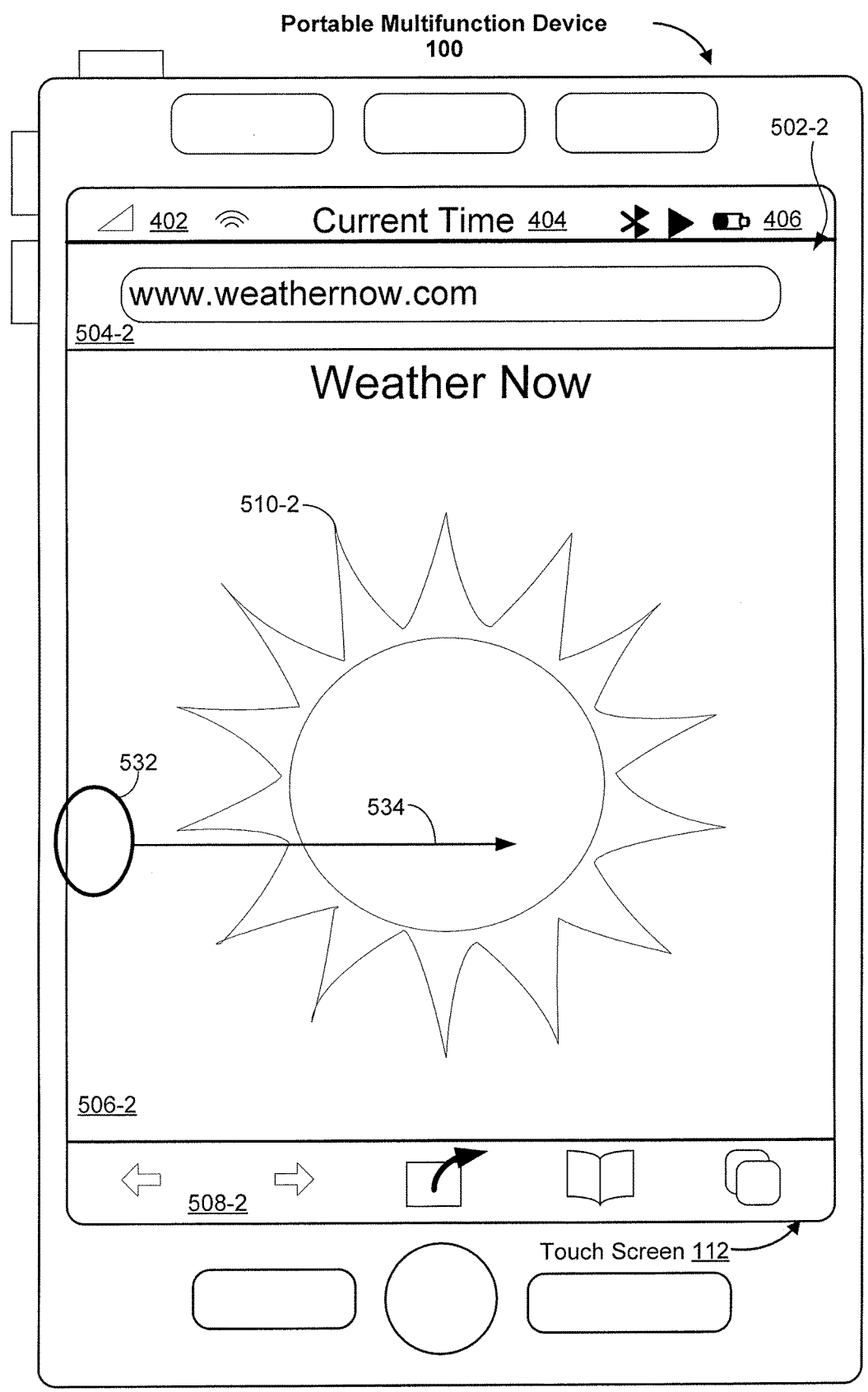

In FIGS. 5K-5M, user interface 502-3, corresponding to the more recently visited content, slides off with a higher proportionality factor than user interface 502-2 slides on. For example, the proportionality factor for user interface 502-3 sliding off is 1:1, and the proportionality factor for user interface 502-2 sliding on is less than 1:1 (e.g., 0.5:1). As shown in FIG. 5K, the center portion of user interface 502-2 is revealed first as user interface 502-3 slides off and user interface 502-2 slides on. As user interface 502-3 is higher in the z-order, user interface 502-3 slides off of touch screen 112 over user interface 502-2, as indicated by drop shadow 516. Thus, the sliding behaviors illustrated in FIGS. 5K-5M are similar to the sliding behaviors illustrated in FIGS. 5E-5G, with the directions reversed, and the details are not repeated here.

FIG. 5M shows user interface 502-2 displayed on touch screen 112 after sliding onto touch screen 112. Device 100 detects a gesture that includes contact 532 moving in direction 534, which is the same direction as direction 530. In response to detecting the gesture, device 100 slides user interface 502-2 off of an edge (the right edge) of touch screen 112 in direction 530, and slides user interface 502-1 in direction 530 onto touch screen 112 from the opposite edge (e.g., the left edge) of touch screen 112, in accordance with the movement of contact 532, as shown in FIGS. 5N-5P.

Figure 5N:
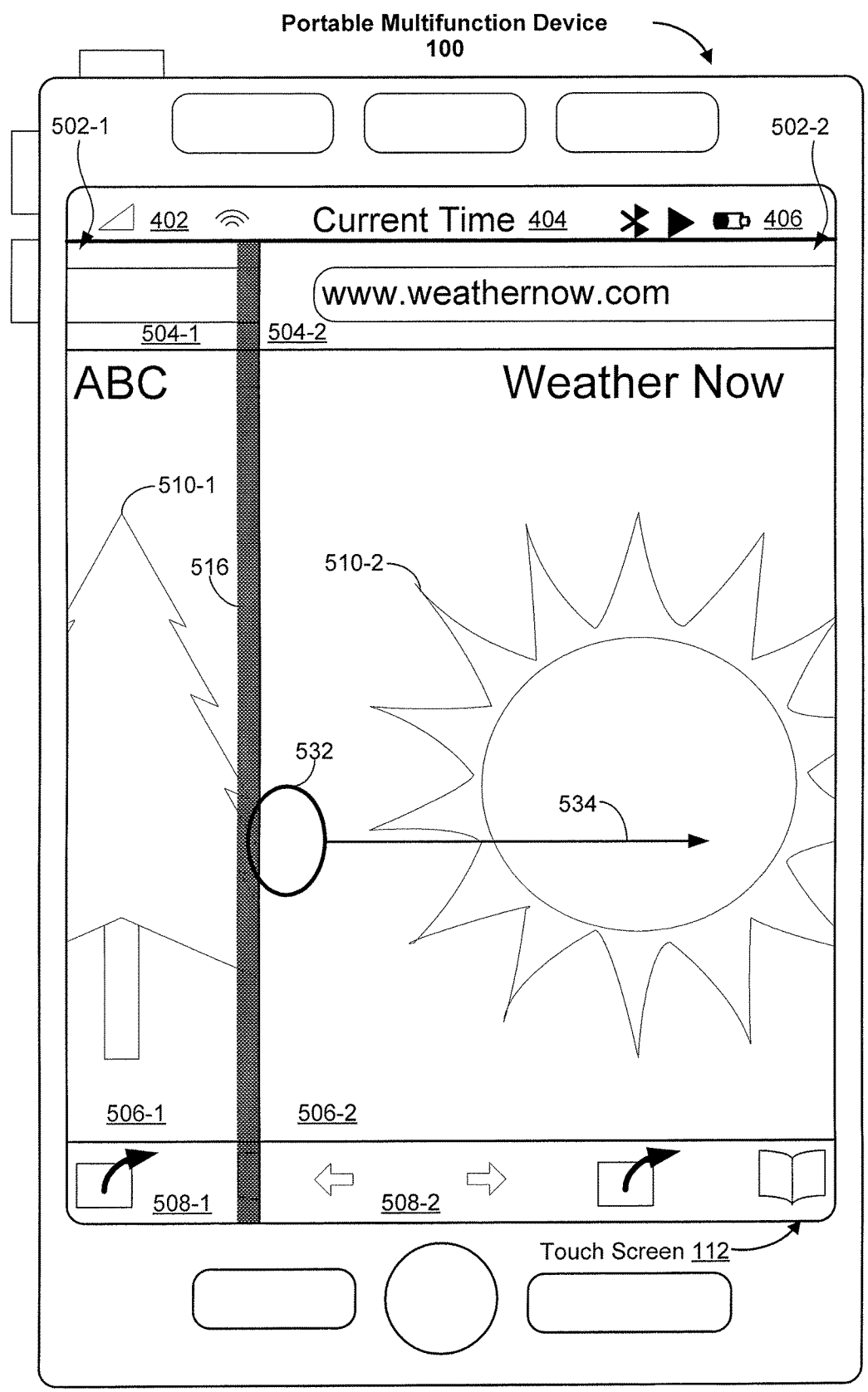
Figure 5O:
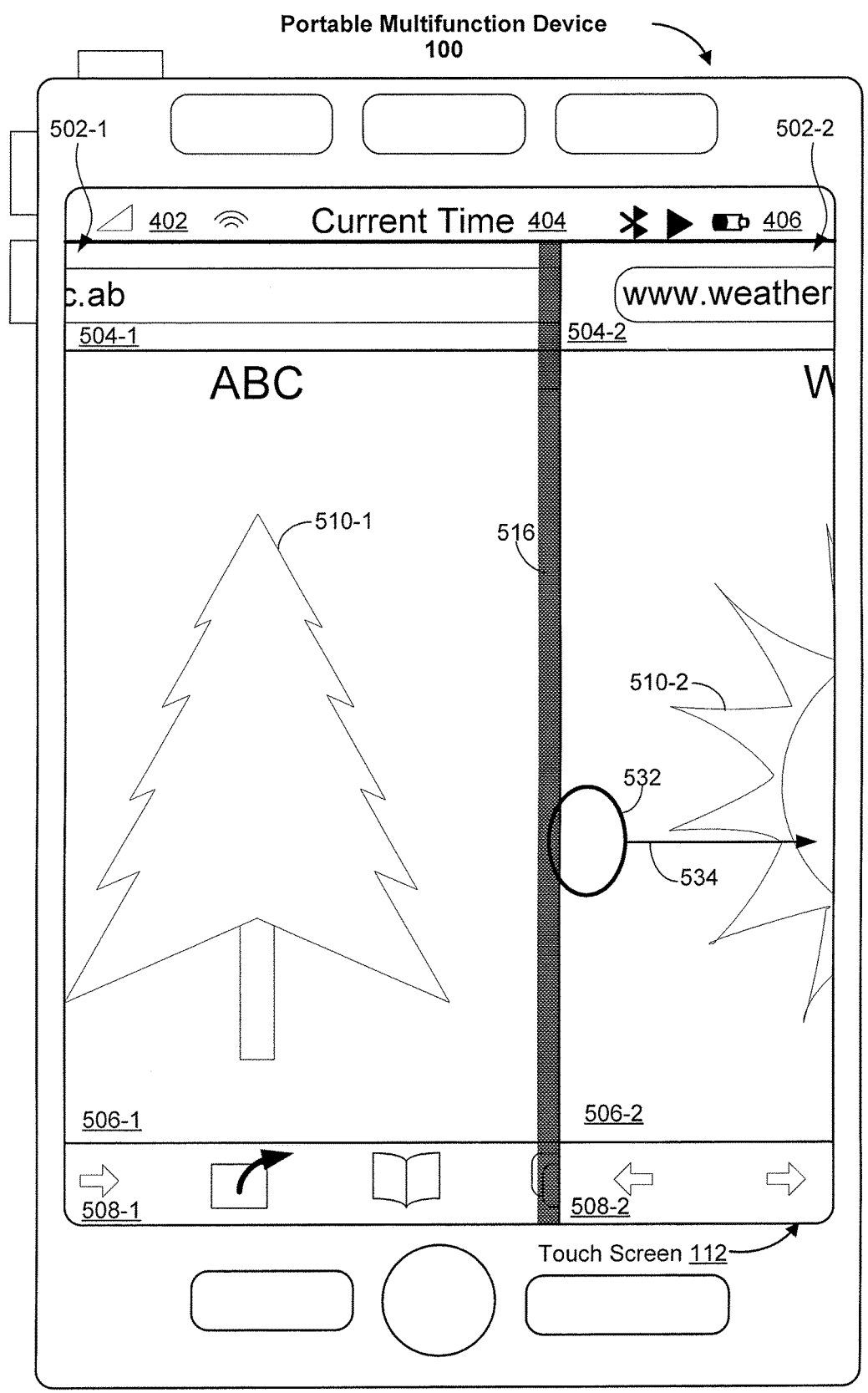
Figure 5P:
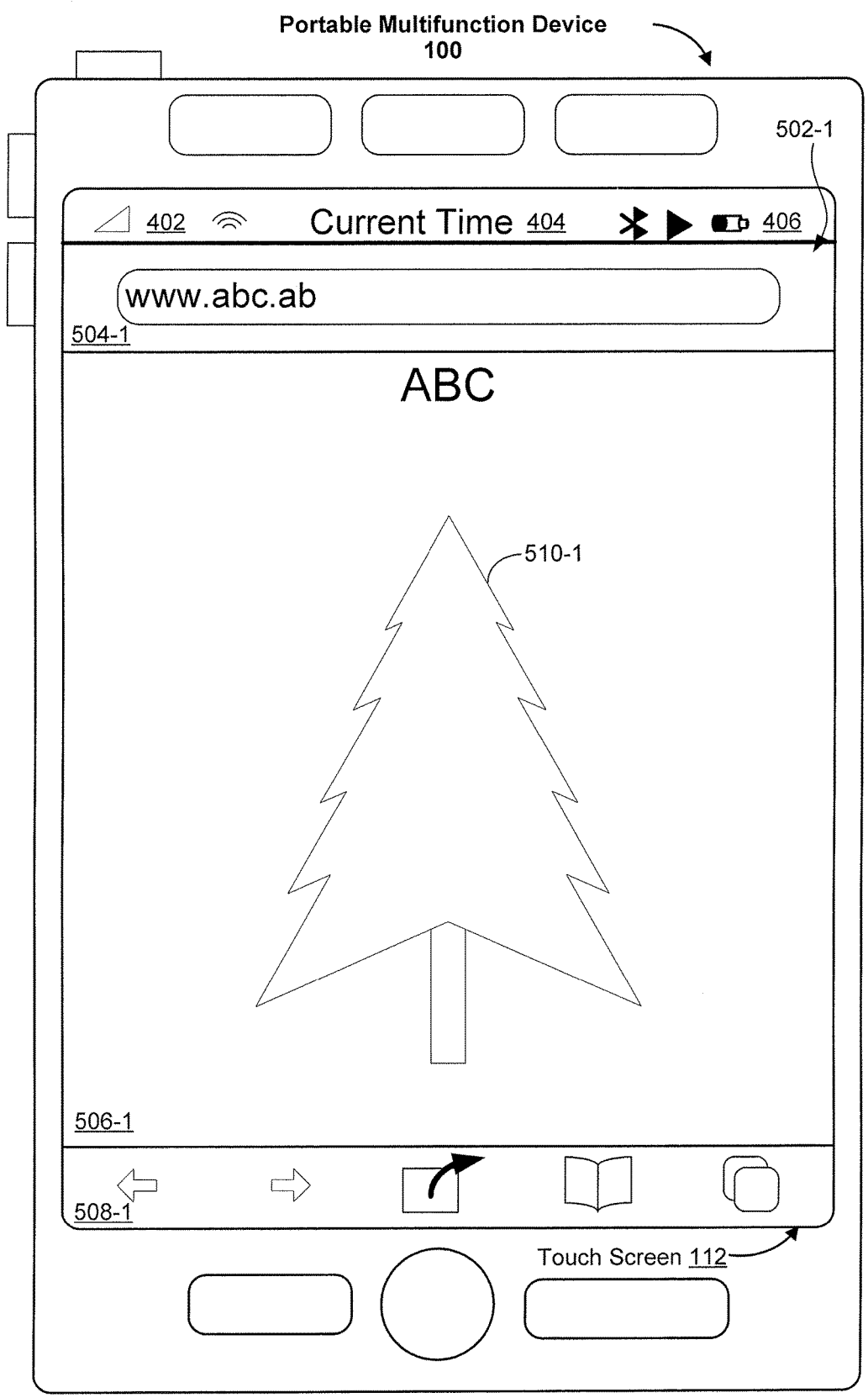

In FIGS. 5N-5P, user interface 502-2, corresponding to the more recently visited content, slides off with a higher proportionality factor than user interface 502-1 slides on. For example, the proportionality factor for user interface 502-2 sliding off is 1:1, and the proportionality factor for user interface 502-1 sliding on is less than 1:1 (e.g., 0.5:1). As shown in FIG. 5N, the center portion of user interface 502-1 is revealed first as user interface 502-2 slides off and user interface 502-1 slides on. As user interface 502-2 is higher in the z-order, user interface 502-2 slides off of touch screen 112 over user interface 502-1, as indicated by drop shadow 516. Thus, the sliding behaviors illustrated in FIGS. 5N-5P are similar to the sliding behaviors illustrated in FIGS. 5K-5M, and the details are not repeated here.

In some embodiments, user interface 502 includes dynamic content that changes over time (e.g., periodically refreshed or updated content, such as weather, stock information, or live results of sporting events). If one or more content refresh criteria (e.g., a certain time has elapsed since the last refresh or update) for the dynamic content has not been met, then when sliding the user interface with the dynamic content on, the user interface that slides on is a static image of the user interface at a particular point in time. If the content refresh criteria are met, the user interface that slides on is the dynamic version.

For example, user interface 502-2 includes current weather information that is updated periodically. FIGS. 5A-5P show a user interface 502-2 that is a static image of user interface 502-2 at a particular point in time; content 506-2 corresponds to weather information before the content refresh criteria is met.

Figure 5Q:
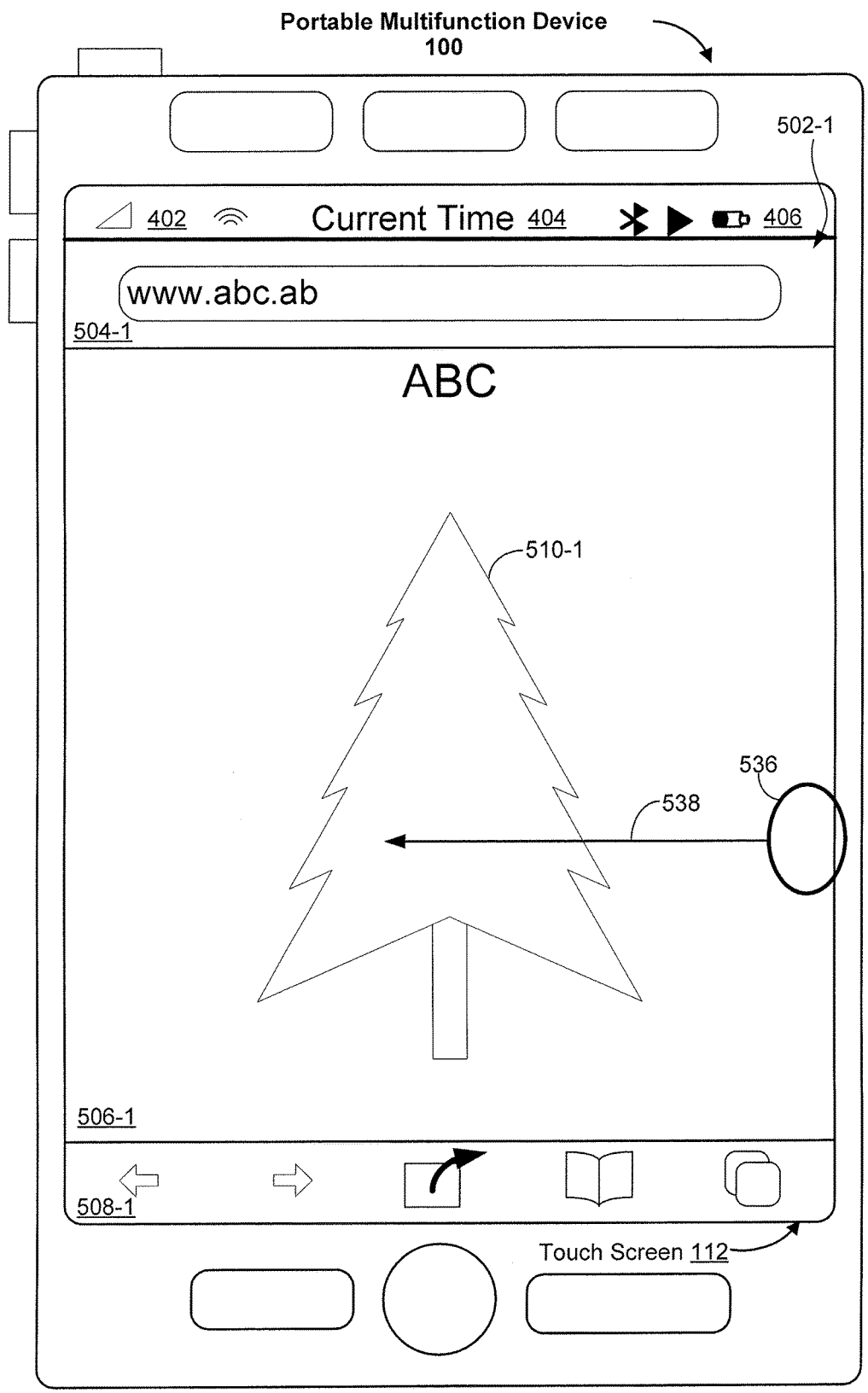
Figure 5R:
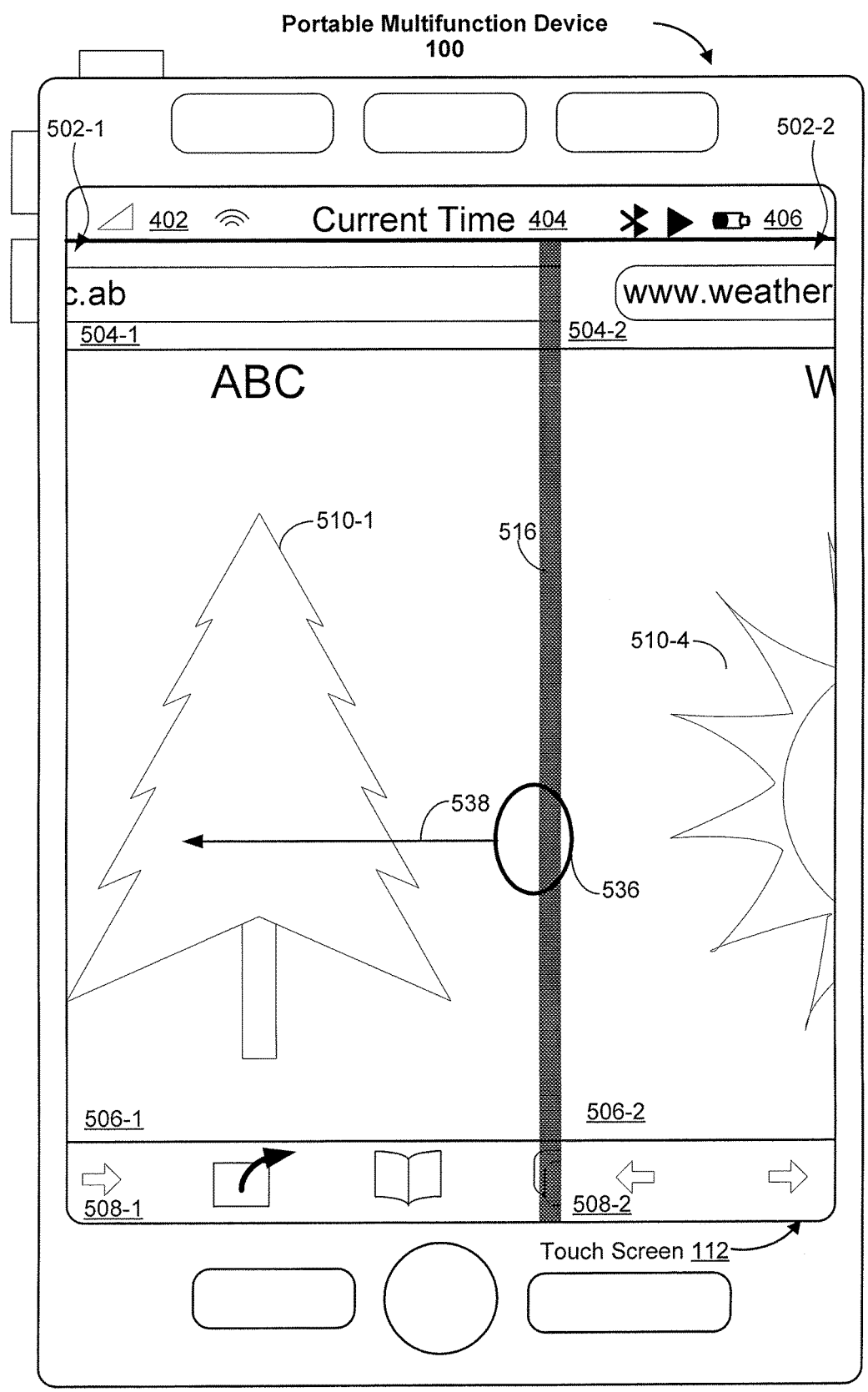
Figure 5S:
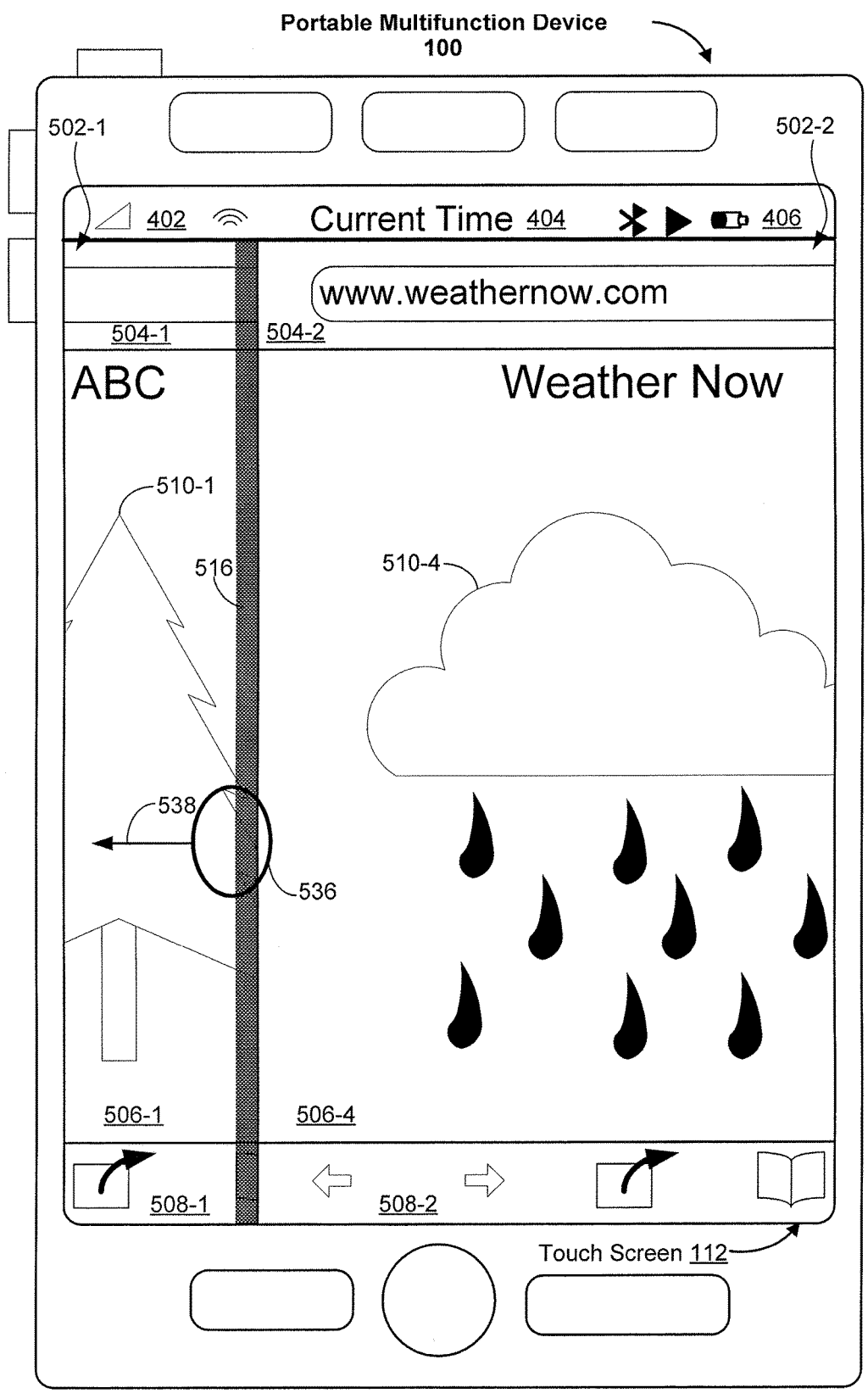
Figure 5T:
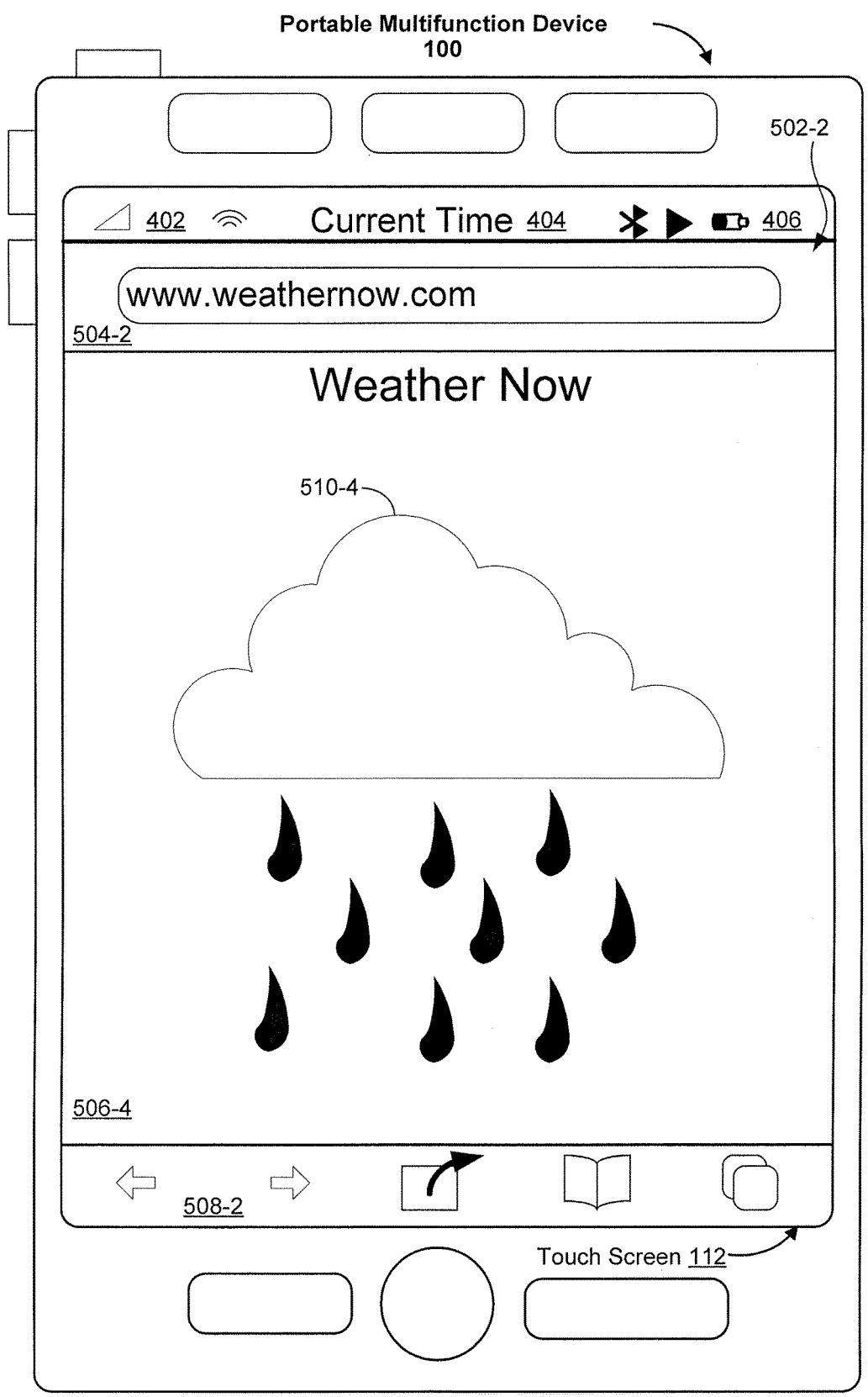

FIG. 5Q shows user interface 502-1 displayed on touch screen 112 and a gesture with movement of contact 536 in direction 538 detected on touch screen 112. In response to detecting the gesture, a dynamic version of user interface 502-2 slides onto touch screen 112 and user interface 502-1 slides off of touch screen 112, as shown in FIGS. 5Q-5T. The dynamic version of user interface 502-2 includes refreshed content 506-2 (e.g., as represented by graphical object 510-4). However, as shown in FIG. 5R, initially, a snapshot of user interface 506-2 that does not correspond to current content of the webpage is displayed (e.g., an image of a sun that was on the webpage when the snapshot was generated is initially displayed moving onto touch screen 112), however, as user interface 506-2 moves further onto the display, device refreshes the webpage and loads current content 506-4 of the webpage that shows a raincloud, as shown in FIGS. 5S-5T.

Figure 5U:
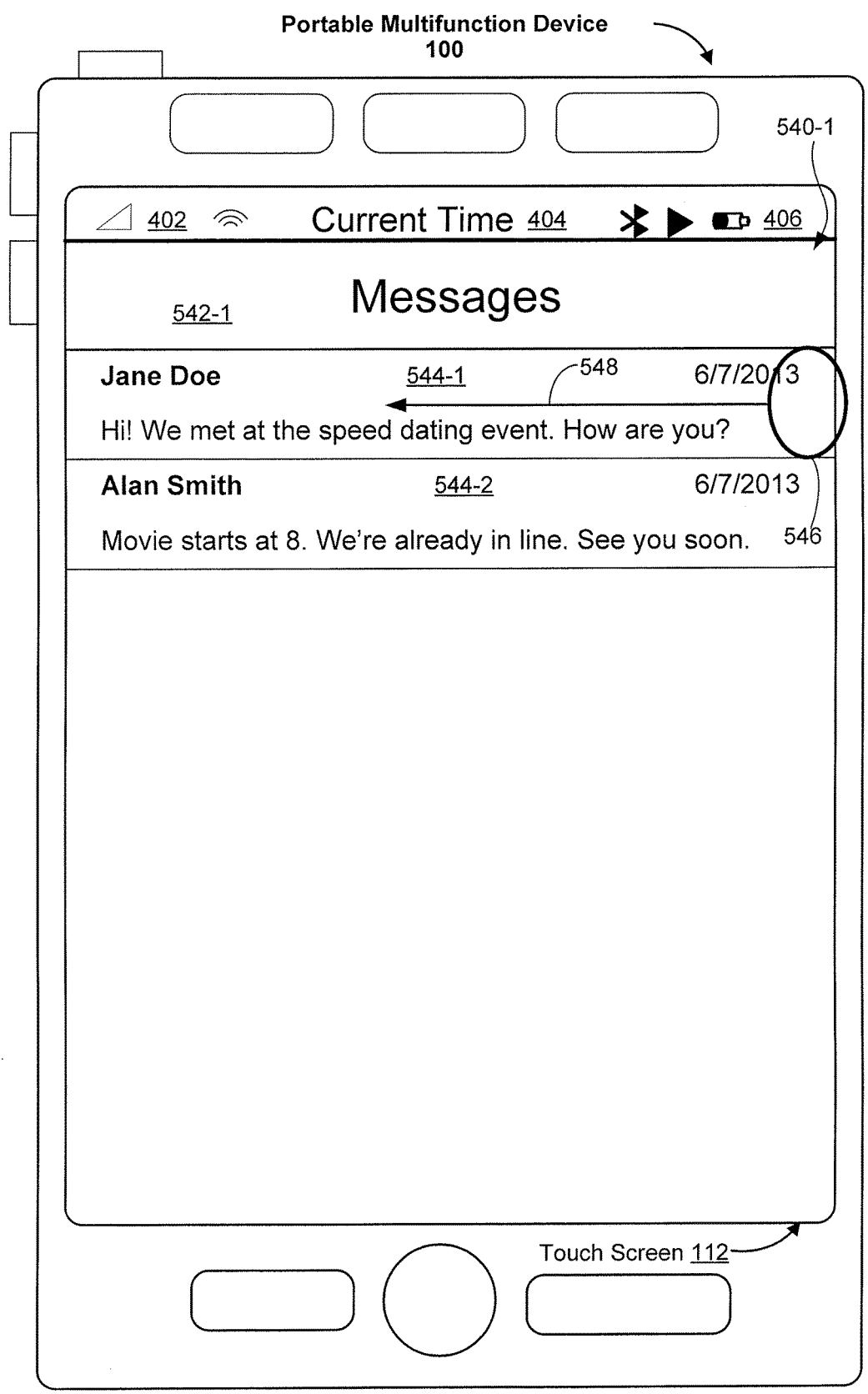
Figure 5V:
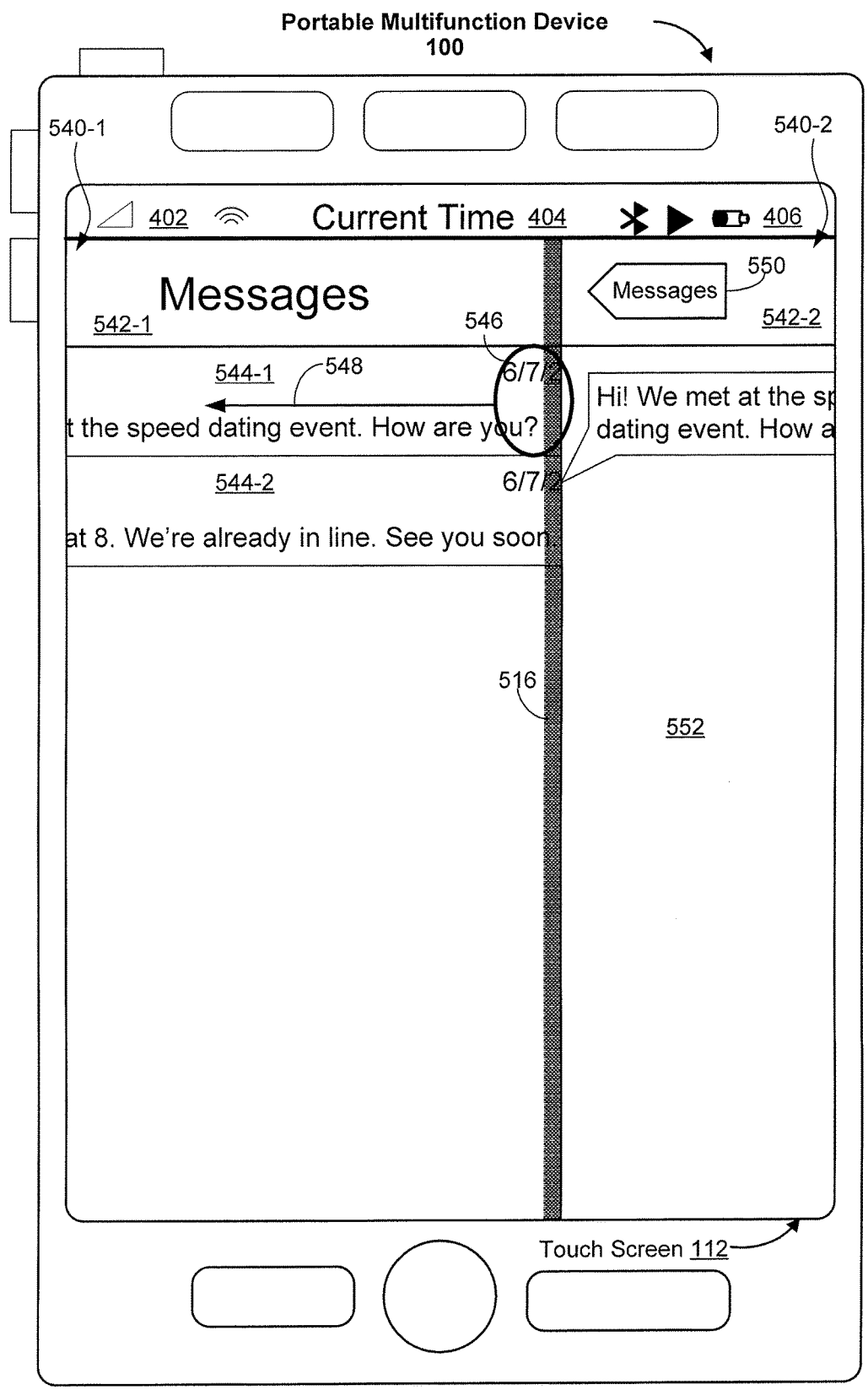
Figure 5W:
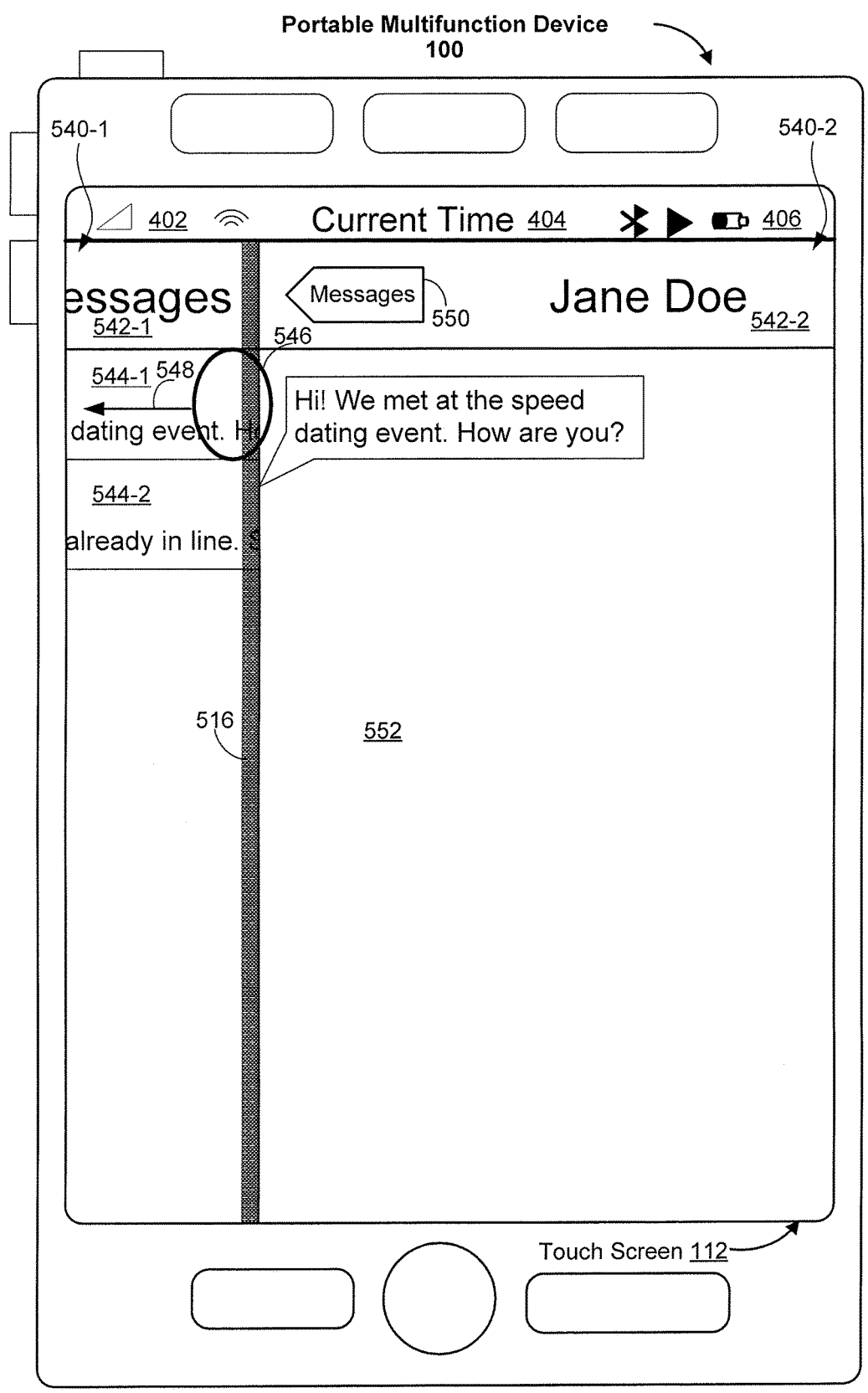
Figure 5X:
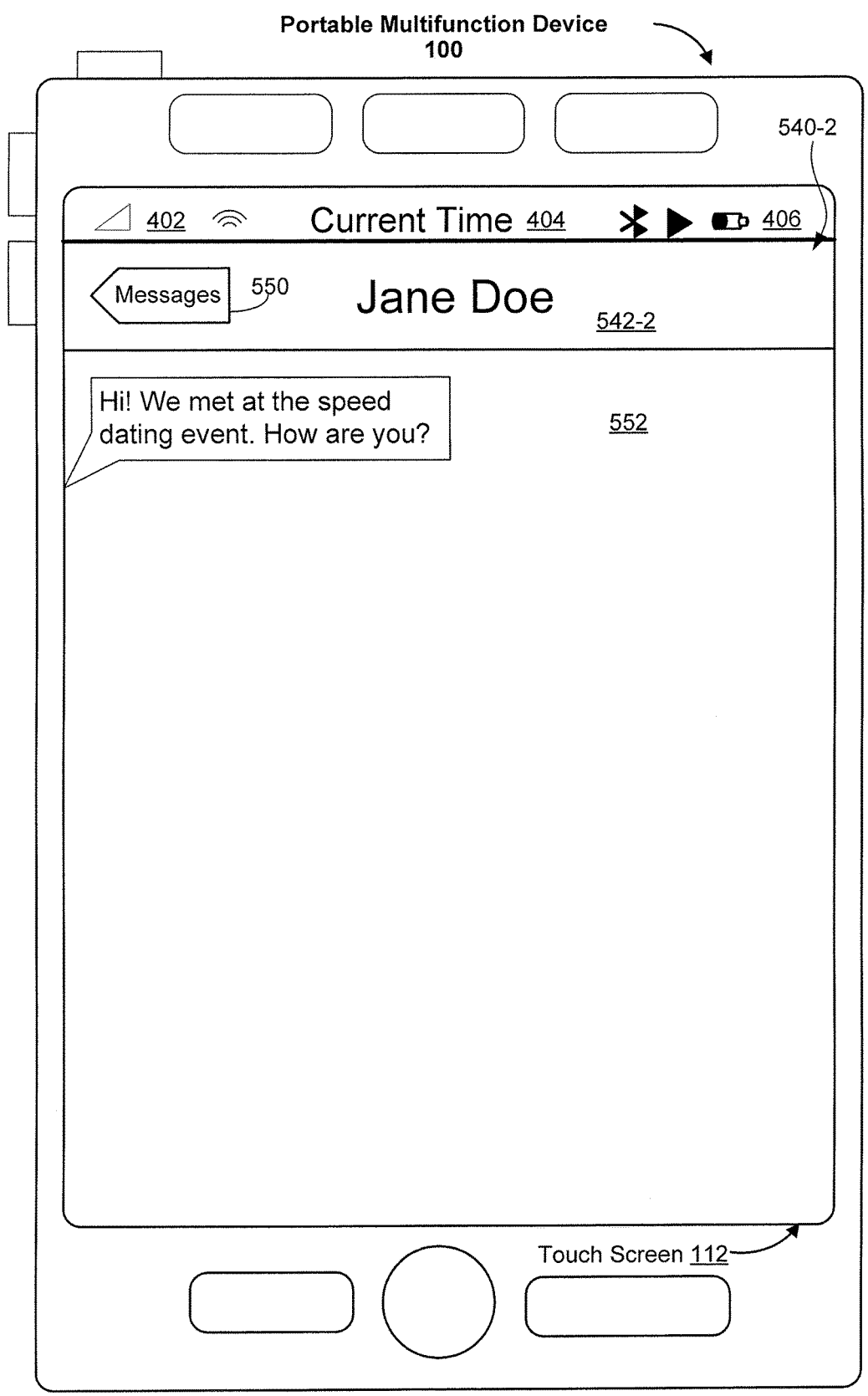
Figure 6A:
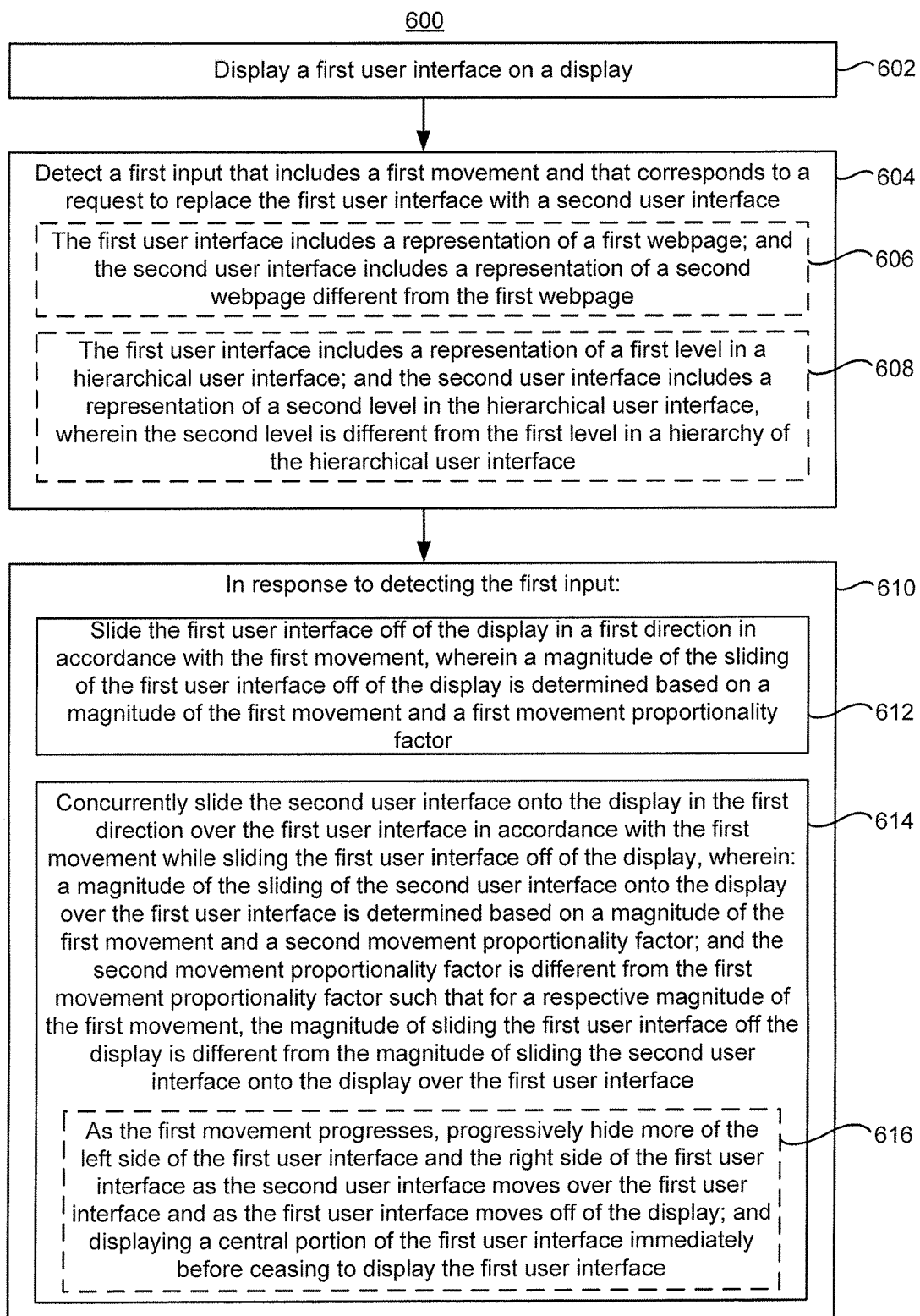
FIGS. 6A-6E are flow diagrams illustrating a method of navigating between user interfaces in accordance with some embodiments.
Figure 6B:
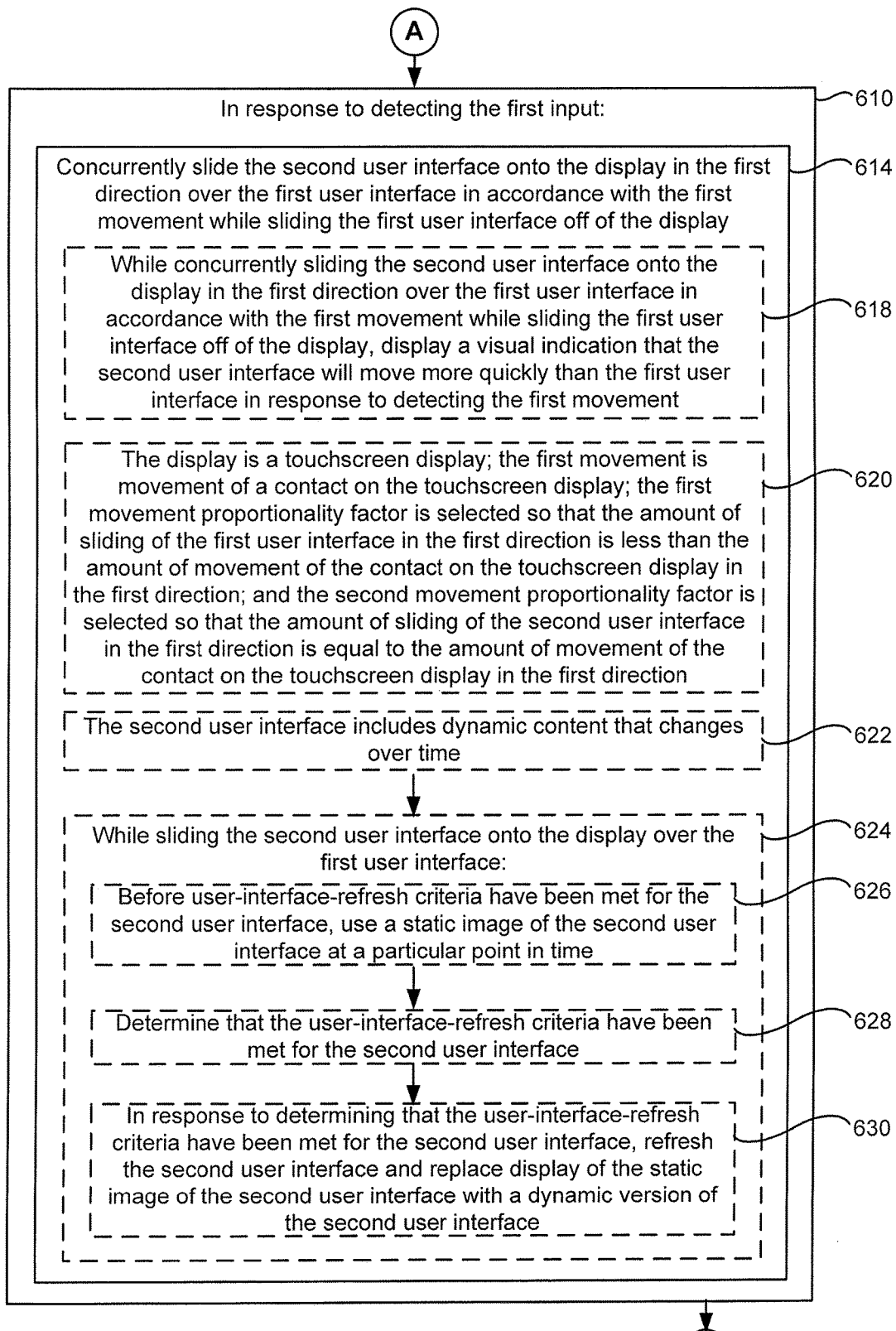
Figure 6C:
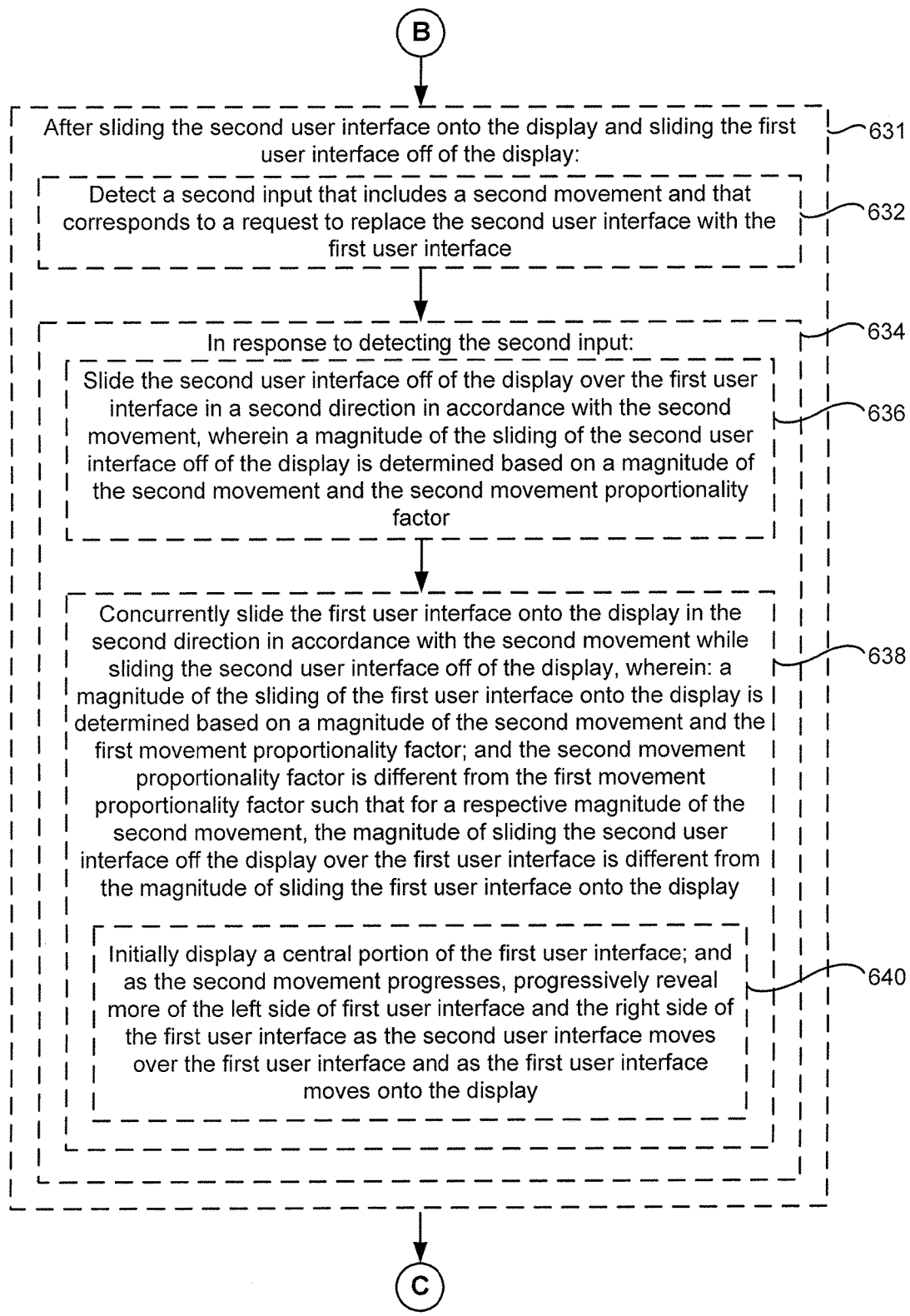
Figure 6D:
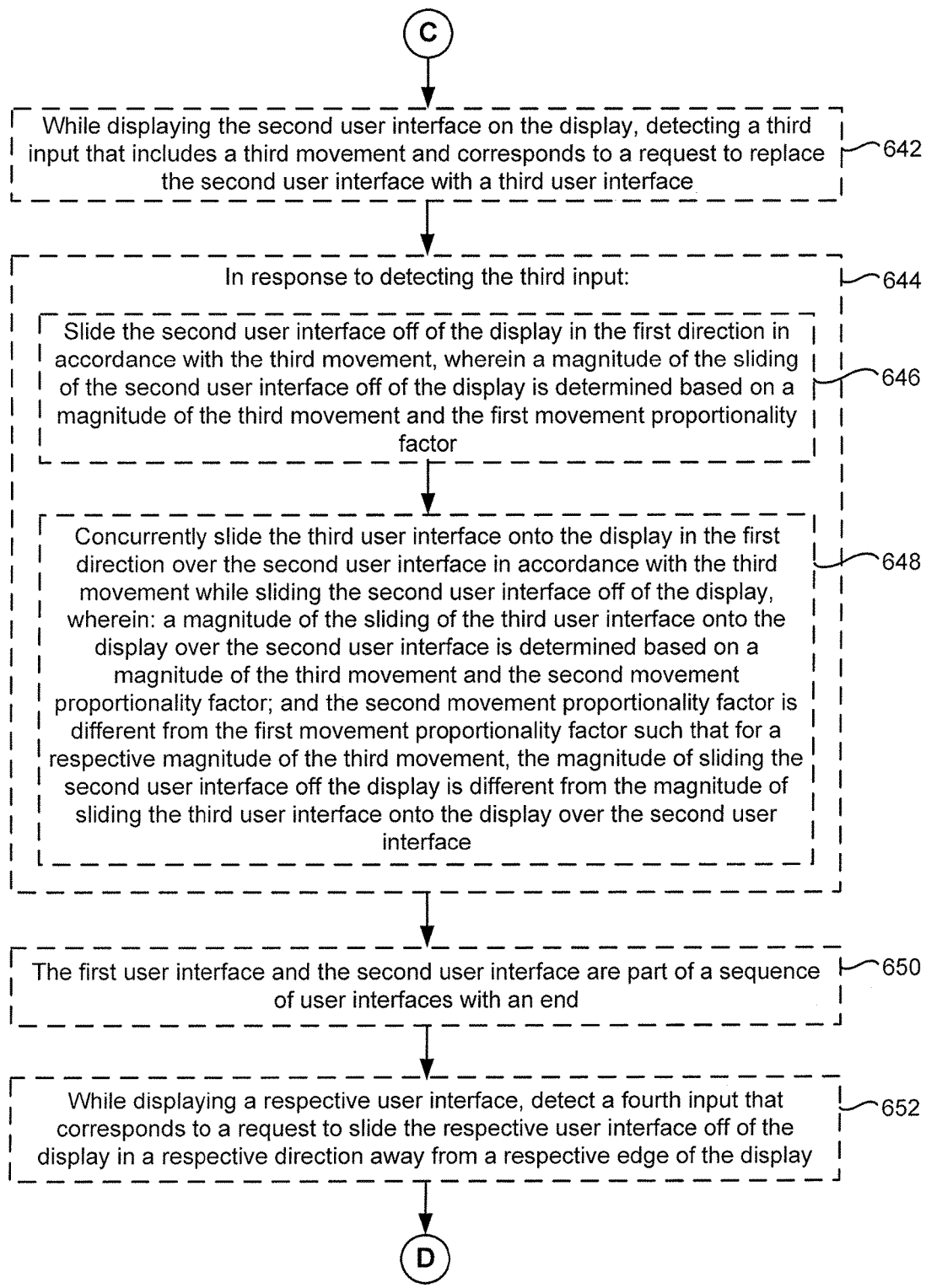
Figure 6E:
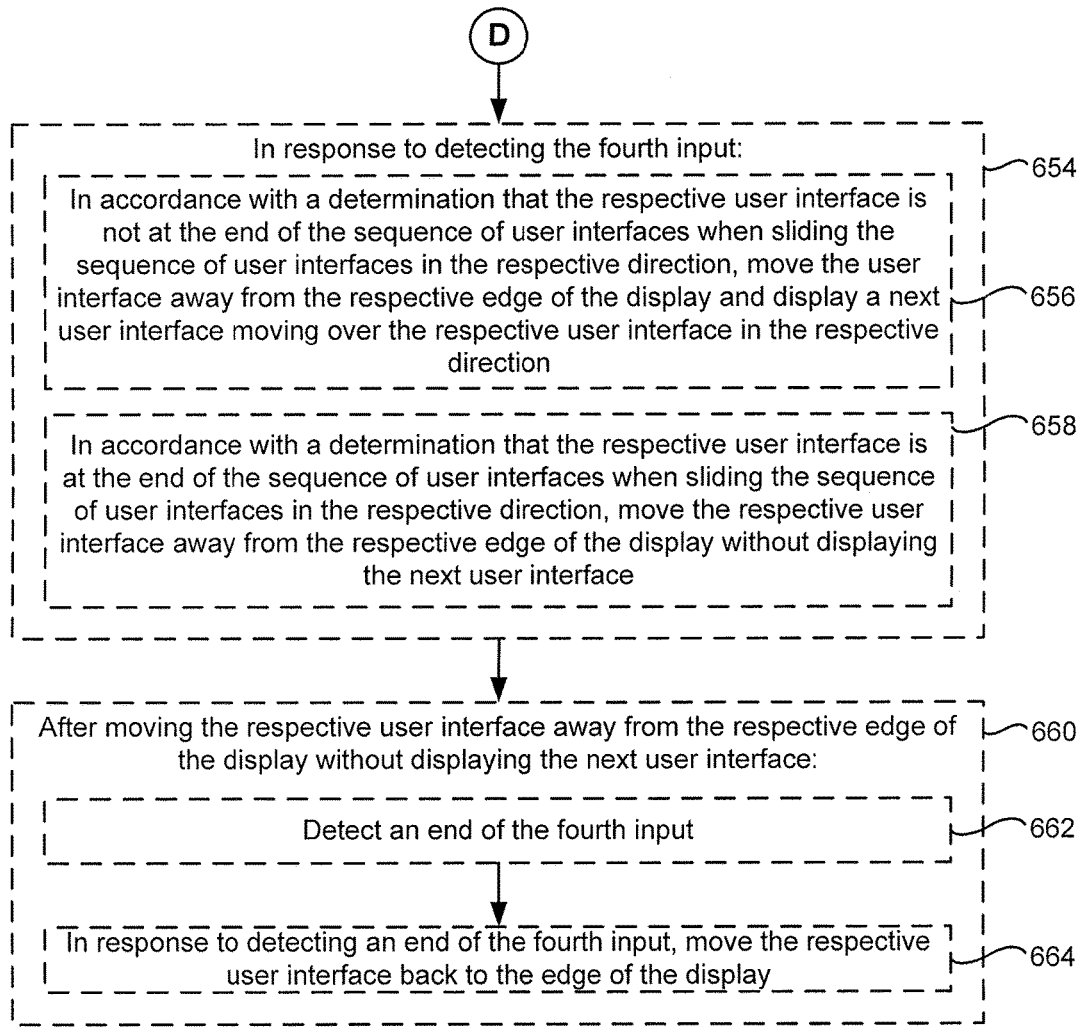

In some embodiments, the user interfaces in the content sequence correspond to levels in a hierarchal user interface. FIGS. 5U-5X illustrate user interface 540 for a messaging application. In FIG. 5U, user interface 540-1 is displayed on touch screen 112. User interface 540-1 includes information bar 542-1 displaying the application name and a listing of message senders 544. Each area displaying a respective sender 544 includes the sender's name, the date of the last message with the sender, and a snippet of that last message. For example, the area displaying sender 544-1 "Jane Doe" displays the date and a snippet of the last message with "Jane Doe."

A gesture with movement of contact 546 in direction 548 is detected on touch screen 112 over the area for sender 544-1. In response to detecting the gesture, device 100 slides user interface 540-2 onto touch screen and slides user interface 540-1 off of touch screen 112, as shown in FIGS. 5V-5X, in a similar manner as the sliding behaviors described above with reference to FIGS. 5A-5D. User interface 540-2 is a next level in the hierarchy of user interfaces 540 for the messaging application. User interface 540-2 includes information bar 542-1 displaying the name of the sender ("Jane Doe"), button 550 to go back to the previous level in the hierarchy (which can also be achieved by a gesture similar to the gesture with contact 546 but in the opposite direction), and an area displaying messages with the sender "Jane Doe." As with the sliding described above, user interface 540-2 slides on faster than, and over, user interface 540-1.

FIGS. 6A-6E are flow diagrams illustrating a method 600 of navigating between user interfaces in accordance with some embodiments. The method 600 is performed at an electronic device (e.g., device 300, FIG. 3, or portable multifunction device 100, FIG. 1A) with a display and optionally a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations is, optionally, changed.

As described below, the method 600 provides an intuitive way to navigate between user interfaces. The method reduces the cognitive burden on a user when navigating between user interfaces, thereby creating a more efficient human-machine interface. For battery-operated electronic devices, enabling a device to display user interface sliding animations faster and more efficiently conserves power and increases the time between battery charges.

The device displays (602) a first user interface on the display. FIGS. 5A and 5Q, for example, show user interface 502-1 displayed on touch screen 112. As another example, FIG. 5U shows user interface 540-1 displayed on touch screen 112.

The device detects (604) a first input (e.g., a finger swipe gesture that starts from a right edge of a touchscreen display) that includes a first movement (e.g., a leftward movement of a contact along a touch-sensitive surface such as a touch-screen display) and that corresponds to a request to replace the first user interface with a second user interface. In FIG. 5A (or 5Q), device 100 detects a gesture that includes movement of contact 512 (or 526) in direction 514 (or 538), and the gesture corresponds to a request to replace user interface 502-1 with user interface 502-2. In FIG. 5U, device 100 detects a gesture that includes movement of contact 546 in direction 548, and the gesture corresponds to a request to replace user interface 540-1 with user interface 540-2.

In some embodiments, the first user interface includes a representation of a first webpage, and the second user interface includes a representation of a second webpage different from the first webpage (606). In some embodiments, the first webpage and the second webpage are webpages in a predetermined sequence of webpages (e.g., a web browser history). In some embodiments, the first user interface is a first tab of a web browser and the second user interface is a second tab of the web browser. In some embodiments, the first webpage and the second webpage are adjacent webpages in a user's web browsing history. For example, the user can navigate through webpages in a web browsing history by sliding a user interface that includes a representation of one webpage over to reveal a user interface that includes a representation of an adjacent webpage from the web browsing history underneath (e.g., for a webpage earlier in the history) or on top of (for a webpage later in the history) a currently displayed representation of a webpage. For example, user interface 502-1 and 502-2 each include web page content 506-1 and 506-2, respectively.

In some embodiments, the first user interface includes a representation of a first level in a hierarchical user interface, and the second user interface includes a representation of a second level in the hierarchical user interface, wherein the first level is different from the first level in a hierarchy of the hierarchical user interface (608). In some embodiments, the first user interface and the second user interface are user interfaces in a sequence of hierarchical user interfaces organized in a predetermined hierarchy. In some embodiments, the second level is deeper into the hierarchy of the hierarchical user interface than the first level (e.g., the first user interface corresponds to a parent of the second user interface in the hierarchy). In some embodiments, the first level is deeper into the hierarchy of the hierarchical user interface than the second level (e.g., the second user interface corresponds to a parent of the first user interface in the hierarchy). For example, user interface 540-1 and 540-2 correspond to respective levels in a hierarchy of user interfaces in a messaging application.

In response to detecting the first input (610), the device slides (612) the first user interface off of the display (e.g., sliding the first user interface off of a first edge of the display such as a left edge of the display) in a first direction in accordance with the first movement, where a magnitude of the sliding of the first user interface off of the display is determined based on a magnitude of the first movement and a first movement proportionality factor (e.g., 0.5:1 where 10 pixels of movement of the contact in a respective direction corresponds to 5 pixels of movement of the first user interface in the respective direction), and concurrently slides (614) the second user interface onto the display (e.g., sliding the second user interface onto the display from a second edge different from or opposite to the first edge of the display, such as a right edge of the display) in the first direction over the first user interface in accordance with the first movement while sliding the first user interface off of the display. A magnitude of the sliding of the second user interface onto the display over the first user interface is determined based on a magnitude of the first movement and a second movement proportionality factor (e.g., 1:1 where 10 pixels of movement of the contact in a respective direction corresponds to 10 pixels of movement of the second user interface in the respective direction), and the second movement proportionality factor is different from the first movement proportionality factor such that for a respective magnitude of the first movement, the magnitude of sliding the first user interface off the display is different from the magnitude of sliding the second user interface onto the display over the first user interface. In some embodiments, the first movement proportionality factor is bigger than the second movement proportionality factor (e.g., the first user interface moves faster than the second user interface). In some embodiments, the second movement proportionality factor is bigger than the first movement proportionality factor (e.g., the second user interface moves faster than the first user interface). Many electronic devices display user interfaces and/or user interface objects that have a layer order (i.e., a z-order or front-to-hack order of the user interface objects relative to a simulated z-axis that extends out of the display). In circumstances where a user interacts with such objects by repositioning them on the display, overlapping objects are, optionally, displayed on the display in accordance with their front-to-hack order (e.g., a first object that is "above," "in front of," "on top of," or "over" a second object is displayed where the first and second objects overlap, in this situation, the second object is sometimes referred to as being "below," "behind," "beneath," or "under" the first object in the layer order or z-order).

For example, in FIG. 5A-5D (or 5Q-5T), user interface 502-1 slides off of touch screen 112 and concurrently user interface 502-2 slides onto touch screen 112, in accordance with the movement of contact 512 (or 536). The sliding off of user interface 502-1 and the sliding on of user interface 502-2 have different speeds, based on different proportionality factors with respect to the magnitude of the movement of contact 512 (or 536).

As another example, in FIGS. 5U-5X, user interface 540-1 slides off of touch screen 112 and concurrently user interface 540-2 slides onto touch screen 112, in accordance with the movement of contact 546. The sliding off of user interface 540-1 and the sliding on of user interface 540-2 have different speeds, based on different proportionality factors with respect to the magnitude of the movement of contact 546.

In some embodiments, concurrently sliding the second user interface onto the display in the first direction in accordance with the first movement while sliding the first user interface off of the display includes (616): as the first movement progresses (e.g., as the first contact moves in the first direction on a touchscreen display), progressively hiding more of the left side of the first user interface and the right side of the first user interface as the second user interface moves over the first user interface and as the first user interface moves off of the display; and displaying a central portion of the first user interface immediately before ceasing to display the first user interface (e.g., the left side of the first user interface slides off of the display while the second user interface is sliding over the right side of the first user interface, such that the central portion of the first user interface is the last part of the first user interface to be displayed before it is completely replaced with the second user interface). For example, FIGS. 5A-5D illustrates, as user interface 502-2 slides onto touch screen 112 and user interface 502-1 slides off, the side portions of user interface 502-1 are hidden first and the center portion (where graphical object 510-1 is displayed) is the last part of user interface 502-1 that is displayed in FIG. 5C before user interface 502-1 ceases to be displayed as shown in FIG. 5D.

In some embodiments, while concurrently sliding the second user interface onto the display in the first direction over the first user interface in accordance with the first movement while sliding the first user interface off of the display, the device displays (618) a visual indication that the second user interface will move more quickly than the first user interface in response to detecting the first movement. For example, the device displays a drop shadow indicating that the second user interface is "over" or "on top of" the first user interface in a simulated third dimension that extends out of the display, and thus that the second user interface will move more quickly than the first user interface. For example, drop shadow 516 is displayed as user interface 502-2 slides over user interface 502-1 or as user interface 502-3 slides over user interface 502-2.

In some embodiments, the display is (620) a touchscreen display, the first movement is movement of a contact on the touchscreen display, the first movement proportionality factor is selected so that the amount of sliding of the first user interface in the first direction is less than the amount of movement of the contact on the touchscreen display in the first direction (e.g., the first movement proportionality factor<1:1 where for each 10 pixels of movement by a contact in a respective direction, the first user interface moves by less than 10 pixels in the respective direction), and the second movement proportionality factor is selected so that the amount of sliding of the second user interface in the first direction is equal to (or substantially/approximately equal to) the amount of movement of the contact on the touchscreen display in the first direction (e.g., the second movement proportionality factor=1:1). For example, the second user interface moves at the same speed at which the contact moves across the touchscreen display and the first user interface moves at the half of the speed at which the contact moves across the touchscreen display. For example, in FIGS. 5A-5D, user interface 502-2 slides on with 1:1 ratio with respect to the movement of contact 512, and user interface 502-1 slides off with a ratio less than 1:1 with respect to the movement of contact 512; user interface 502-2 slides at the same speed as the movement of contact 512, and user interface 502-1 slides off at a slower speed than the movement of contact 512.

In some embodiments, the second user interface includes (622) dynamic content that changes over time (e.g., the second user interface is a webpage or other content that is periodically refreshed or re-rendered). For example, user interface 502-2 includes weather information that is periodically refreshed.

Concurrently sliding the second user interface onto the display in the first direction over the first user interface in accordance with the first movement while sliding the first user interface off of the display includes, while sliding the second user interface onto the display over the first user interface (624): before user-interface-refresh criteria have been met for the second user interface, the device uses (626) a static image of the second user interface at a particular point in time, determines (628) that the user-interface-refresh criteria have been met for the second user interface, and in response to determining that the user-interface-refresh criteria have been met for the second user interface, refreshes (630) the second user interface and replacing display of the static image of the second user interface with a dynamic version of the second user interface. In some embodiments, the static image of the second user interface was generated by the device when the user last visited (or last navigated away from) the second user interface.

For example, in some embodiments where the second user interface is a webpage, a snapshot of the webpage is stored in response to navigation away from the webpage. When the user navigates back to the webpage, the snapshot is displayed while the webpage is loaded. When the webpage is sufficiently loaded, the snapshot is replaced by the (fully or partially) loaded webpage. In some embodiments, determining whether the webpage is sufficiently loaded is based on monitoring of pre-selected criteria (e.g., how much has the webpage changed, how much of the webpage is being previewed, and/or how long has the user been previewing the webpage). Examples of pre-selected criteria used to determine whether a webpage is sufficiently loaded to replace a snapshot are discussed in U.S. Pat. Pub. No. 2012/0311429 which is hereby incorporated by reference in its entirety. While using a snapshot as a placeholder for a webpage has been described above with reference to the second user interface, similar operations are, optionally, performed when other user interfaces (e.g., the first user interface or the third user interface) start to be displayed on the display in response to user inputs, so as to reduce latency and improve the responsiveness of the device, thereby improving the user experience when switching between user interfaces. For example, before the refresh criteria is met (e.g., user interface has slid more than 25%, 30%, 33%, 40% or 50% of the way onto touch screen 112), a static version of user interface 502-2, with static content 506-2 slides onto touch screen 112 in response to detection of the gesture, as shown in FIGS. 5Q-5R. When device 100 determines that the refresh criteria are met, a dynamic version of user interface 502-2, with refreshed content 506-4, slides onto touch screen 112 in response to detection of the gesture, as shown in FIGS. 5S-5T.

In some embodiments, after sliding the second user interface onto the display and sliding the first user interface off of the display (631), the device detects (632) a second input (e.g., a finger swipe gesture that starts from a left edge of a touchscreen display) that includes a second movement (e.g., a rightward movement of a contact along a touch-sensitive surface such as a touchscreen display) and that corresponds to a request to replace the second user interface with the first user interface. In FIG. 5M, after user interface 502-1 had slid off of touch screen 112 before and user interface 502-2 is displayed after having slid onto touch screen 112, device 100 detects a gesture that includes movement of contact 532 in direction 534 (which is the opposite of direction 514), and the gesture corresponds to a request to replace user interface 502-2 with user interface 502-1.

In response to detecting the second input (634), the device slides (636) the second user interface off of the display over the first user interface (e.g., sliding the second user interface off of a second edge of the display such as the right edge of the display) in a second direction (e.g., a direction opposite the first direction) in accordance with the second movement, where a magnitude of the sliding of the second user interface off of the display is determined based on a magnitude of the second movement and the second movement proportionality factor (e.g., 1:1); and concurrently slides (638) the first user interface onto the display (e.g., sliding the first user interface onto the display from the first edge of the display, such as a left edge of the display) in the second direction in accordance with the second movement while sliding the second user interface off of the display. A magnitude of the sliding of the first user interface onto the display is determined based on a magnitude of the second movement and the first movement proportionality factor (e.g., 0.5:1), and the second movement proportionality factor is different from the first movement proportionality factor such that for a respective magnitude of the second movement, the magnitude of sliding the second user interface off the display over the first user interface is different from the magnitude of sliding the first user interface onto the display.

For example, in FIGS. 5M-5P, user interface 502-2 slides off of touch screen 112 and concurrently user interface 502-1 slides onto touch screen 112, in accordance with the movement of contact 532. The sliding off of user interface 502-2 and the sliding on of user interface 502-1 have different speeds, based on different proportionality factors with respect to the magnitude of the movement of contact 532.

In some embodiments, concurrently sliding the first user interface onto the display in the second direction in accordance with the second movement while sliding the second user interface off of the display over the first user interface includes (640): initially displaying a central portion of the first user interface, and as the second movement progresses (e.g., as the second contact moves in the second direction on a touchscreen display), progressively revealing more of the left side of first user interface and the right side of the first user interface as the second user interface moves over the first user interface and as the first user interface moves onto the display (e.g., the left side of the first user interface slides onto the display while the second user interface is sliding off of the display over the right side of the first user interface, such that the central portion of the first user interface is the first part of the first user interface to be displayed as the first user interface starts to replace the second user interface, and the central portion of the first user interface that is initially displayed expands to the left and to the right as the second movement progresses). For example, FIGS. 5M-5P illustrates, as user interface 502-1 slides onto touch screen 112 and user interface 502-2 slides off, the center portion of user interface 502-1 is displayed first, and the side portions of user interface 502-1 are revealed as user interface 502-2 slides off and user interface 502-1 slides on.

In some embodiments, while displaying the second user interface on the display (e.g., after sliding the second user interface onto the display), the device detects (642) a third input (e.g., a finger swipe gesture that starts from an edge of a touchscreen display) that includes a third movement (e.g., a leftward movement of a contact along a touch-sensitive surface such as a touchscreen display) and corresponds to a request to replace the second user interface with a third user interface. In FIG. 5D, while user interface 502-2 is displayed on touch screen 112, device 100 detects a gesture that includes movement of contact 518 in direction 520 (which is the same direction as direction 514), and the gesture corresponds to a request to replace user interface 502-2 with user interface 502-3.

In response to detecting the third input (644), the device slides (646) the second user interface off of the display (e.g., sliding the second user interface off of a first edge of the display such as a left edge of the display) in the first direction in accordance with the third movement, where a magnitude of the sliding of the second user interface off of the display is determined based on a magnitude of the third movement and the first movement proportionality factor (e.g., 0.5:1); and concurrently slides (648) the third user interface onto the display (e.g., sliding the third user interface onto the display from a second edge different from or opposite to the first edge of the display, such as a right edge of the display) in the first direction over the second user interface in accordance with the third movement while sliding the second user interface off of the display. A magnitude of the sliding of the third user interface onto the display over the second user interface is determined based on a magnitude of the third movement and the second movement proportionality factor (e.g., 1:1), and the second movement proportionality factor is different from the first movement proportionality factor such that for a respective magnitude of the third movement, the magnitude of sliding the second user interface off the display is different from the magnitude of sliding the third user interface onto the display over the second user interface. For example, in FIGS. 5D-5G, user interface 502-2 slides off of touch screen 112 and concurrently user interface 502-3 slides onto touch screen 112, in accordance with the movement of contact 518. The sliding off of user interface 502-2 and the sliding on of user interface 502-3 have different speeds, based on different proportionality factors with respect to the magnitude of the movement of contact 518.

In some embodiments, the first user interface and the second user interface are part of a sequence of (separately displayed) user interfaces with an end (650). For example, user interfaces 502 correspond to content in a web browser history (a sequence of content ordered by the date and time of the last visit or view). User interface 502-3 corresponds to the most recently visited content in the web browser history, and this corresponds to an end of the sequence.

While displaying a respective user interface, the device detects (652) a fourth input that corresponds to a request to slide the respective user interface off of the display in a respective direction away from a respective edge of the display. In response to detecting the fourth input (654): in accordance with a determination that the respective user interface is not at the end of the sequence of user interfaces when sliding the sequence of user interfaces in the respective direction, the device moves (656) the user interface away from the respective edge of the display and displaying a next user interface (e.g., a user interface that is adjacent to the second user interface in the sequence of user interfaces) moving over the respective user interface in the respective direction; and in accordance with a determination that the respective user interface is at the end of the sequence of user interfaces when sliding the sequence of user interfaces in the respective direction, the device moves (658) the respective user interface away from the respective edge of the display without displaying the next user interface. FIG. 5O, for example, shows user interface 502-3 displayed on touch screen 112 and a gesture with movement of contact 522 detected on touch screen 112. In response to detecting the contact, user interface 502-3 slides away from the right edge of touch screen 112, but does not slide off completely, in accordance with the movement of contact 522, as shown in FIGS. 5G-5H. On the other hand, in FIGS. 5D-5G for example, user interface 502-2 (which does not correspond to the end of the sequence) slides off of touch screen 112 and user interface 502-3 slides onto touch screen 112 in response to detection of the gesture with movement of contact 522.

In some embodiments, after (660) moving the respective user interface away from the respective edge of the display without displaying the next user interface (e.g., when the respective user interface is at the end of the sequence of user interfaces when sliding the sequence of user interfaces in the respective direction), the device detects (662) an end of the fourth input (e.g., detecting liftoff of a contact that performed the fourth input), and in response to detecting an end of the fourth input, moves (664) the respective user interface back to the edge of the display (e.g., displaying a rubberband effect where the respective user interface is configured to pull away from an edge of the display in response to detecting a user input that corresponds to dragging the respective user interface away from the edge of the display, but the respective user interface snaps back to the edge of the display when the user ends the input by lifting the contact from the touch-sensitive surface). As shown in FIGS. 5H-5J, for example, user interface 502-3 slides in direction 526 back to the right edge of touch screen 112 in response to detection of the end of the gesture with contact 522. In some embodiments, when the respective user interface is at the end of the sequence of user interfaces, the proportionality factor for moving the respective user interface away from the edge of the display gradually decreases as the user interface is moved further away from the edge of the display, so that it gets harder and harder for the user to pull the user interface away from the edge of the display (e.g., when the user interface is within 10 pixels of the edge of the display the proportionality factor is close to 1:1 and when the user interface is 50 pixels away from the edge of the display, the proportionality factor is close to 0.5:1, and when the user interface is 100 pixels away from the edge of the display, the proportionality factor is close to 0.1:1).

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein.

Figure 7:
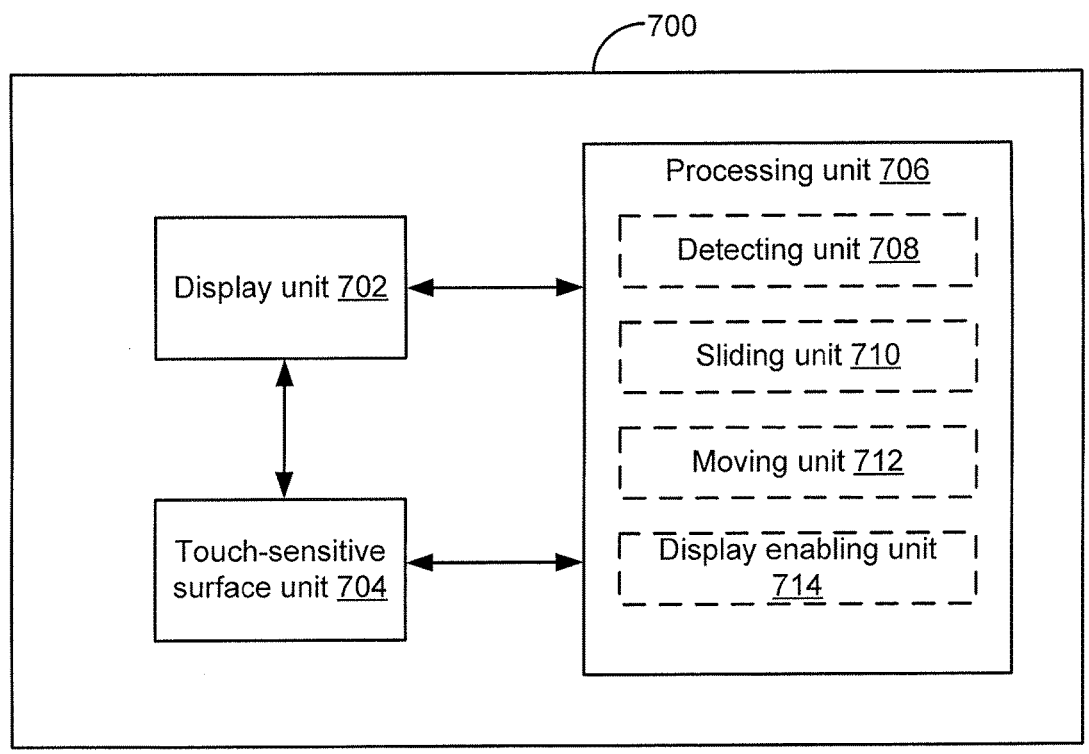
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a first user interface, optionally a touch-sensitive surface unit 704, and a processing unit 706 coupled to the display unit 702 and, optionally, touch-sensitive surface unit 704. In some embodiments, the processing unit 706 includes a detecting unit 708, a sliding unit 710, a moving unit 712, and a display enabling unit 714.

The processing unit 706 is configured to: detect a first input (e.g., on touch-sensitive surface unit 704) that includes a first movement and that corresponds to a request to replace the first user interface with a second user interface (e.g., with the detecting unit 708); and in response to detecting the first input: slide the first user interface off of the display unit 702 in a first direction in accordance with the first movement (e.g., with the sliding unit 710), wherein a magnitude of the sliding of the first user interface off of the display unit 702 is determined based on a magnitude of the first movement and a first movement proportionality factor; and concurrently slide the second user interface onto the display unit 702 in the first direction over the first user interface in accordance with the first movement while sliding the first user interface off of the display unit 702 (e.g., with the sliding unit 710). A magnitude of the sliding of the second user interface onto the display unit 702 over the first user interface is determined based on a magnitude of the first movement and a second movement proportionality factor, and the second movement proportionality factor is different from the first movement proportionality factor such that for a respective magnitude of the first movement, the magnitude of sliding the first user interface off the display unit 702 is different from the magnitude of sliding the second user interface onto the display unit 702 over the first user interface.

In some embodiments, the processing unit 706 is configured to, after sliding the second user interface onto the display unit 702 and sliding the first user interface off of the display unit 702: detect a second input that includes a second movement and that corresponds to a request to replace the second user interface with the first user interface (e.g., with the detecting unit 708); and in response to detecting the second input: slide the second user interface off of the display unit 702 over the first user interface in a second direction in accordance with the second movement (e.g., with the sliding unit 710), wherein a magnitude of the sliding of the second user interface off of the display unit 702 is determined based on a magnitude of the second movement and the second movement proportionality factor; and concurrently slide the first user interface onto the display unit 702 in the second direction in accordance with the second movement while sliding the second user interface off of the display unit 702 (e.g., with the sliding unit 710). A magnitude of the sliding of the first user interface onto the display unit 702 is determined based on a magnitude of the second movement and the first movement proportionality factor, and the second movement proportionality factor is different from the first movement proportionality factor such that for a respective magnitude of the second movement, the magnitude of sliding the second user interface off the display unit 702 over the first user interface is different from the magnitude of sliding the first user interface onto the display unit 702.

In some embodiments, concurrently sliding the first user interface onto the display unit 702 in the second direction in accordance with the second movement while sliding the second user interface off of the display unit 702 over the first user interface includes: initially enabling display of a central portion of the first user interface; and as the second movement progresses, progressively revealing more of the left side of first user interface and the right side of the first user interface as the second user interface moves over the first user interface and as the first user interface moves onto the display unit 702.

In some embodiments, concurrently sliding the second user interface onto the display unit 702 in the first direction in accordance with the first movement while sliding the first user interface off of the display unit 702 includes: as the first movement progresses, progressively hiding more of the left side of the first user interface and the right side of the first user interface as the second user interface moves over the first user interface and as the first user interface moves off of the display unit 702; and enabling display of a central portion of the first user interface immediately before ceasing to display the first user interface.

In some embodiments, the processing unit 706 is configured to: while enabling display of the second user interface on the display unit 702, detect a third input that includes a third movement and corresponds to a request to replace the second user interface with a third user interface (e.g., with the detecting unit 708); and in response to detecting the third input: slide the second user interface off of the display unit 702 in the first direction in accordance with the third movement (e.g., with the sliding unit 710), wherein a magnitude of the sliding of the second user interface off of the display unit 702 is determined based on a magnitude of the third movement and the first movement proportionality factor; and concurrently slide the third user interface onto the display unit 702 in the first direction over the second user interface in accordance with the third movement while sliding the second user interface off of the display unit 702 (e.g., with the sliding unit 710). A magnitude of the sliding of the third user interface onto the display unit 702 over the second user interface is determined based on a magnitude of the third movement and the second movement proportionality factor, and the second movement proportionality factor is different from the first movement proportionality factor such that for a respective magnitude of the third movement, the magnitude of sliding the second user interface off the display unit 702 is different from the magnitude of sliding the third user interface onto the display unit 702 over the second user interface.

In some embodiments, the first user interface and the second user interface are part of a sequence of user interfaces with an end, and the processing unit 706 is configured to: while enabling display of a respective user interface, detect a fourth input, that corresponds to a request to slide the respective user interface off of the display unit 702 in a respective direction away from a respective edge of the display unit 702 (e.g., with the detecting unit 708); and in response to detecting the fourth input: in accordance with a determination that the respective user interface is not at the end of the sequence of user interfaces when sliding the sequence of user interfaces in the respective direction, move the user interface away from the respective edge of the display unit 702 (e.g., with the moving unit 712) and enable display of a next user interface moving over the respective user interface in the respective direction (e.g., with the display enabling unit 714); and in accordance with a determination that the respective user interface is at the end of the sequence of user interfaces when sliding the sequence of user interfaces in the respective direction, move the respective user interface away from the respective edge of the display unit 702 (e.g., with the moving unit 712) without enabling display of the next user interface.

In some embodiments, the processing unit 706 is configured to, after moving the respective user interface away from the respective edge of the display unit 702 without enabling display of the next user interface: detect an end of the fourth input (e.g., with the detecting unit 708); and in response to detecting an end of the fourth input, move the respective user interface back to the edge of the display unit 702 (e.g., with the moving unit 712).

In some embodiments, the processing unit 706 is configured to, while concurrently sliding the second user interface onto the display unit 702 in the first direction over the first user interface in accordance with the first movement while sliding the first user interface off of the display unit 702, enable display of a visual indication that the second user interface will move more quickly than the first user interface in response to detecting the first movement (e.g., with the display enabling unit 714).

In some embodiments, the display unit 702 is a touch-screen display (e.g., display unit 702 is integrated with a touch-sensitive surface unit 704), the first movement is movement of a contact on the touchscreen display, the first movement proportionality factor is selected so that the amount of sliding of the first user interface in the first direction is less than the amount of movement of the contact on the touchscreen display in the first direction, and the second movement proportionality factor is selected so that the amount of sliding of the second user interface in the first direction is equal to the amount of movement of the contact on the touchscreen display in the first direction.

In some embodiments, the second user interface includes dynamic content that changes over time; and concurrently sliding the second user interface onto the display unit 702 in the first direction over the first user interface in accordance with the first movement while sliding the first user interface off of the display unit 702 includes, while sliding the second user interface onto the display unit 702 over the first user interface: before user-interface-refresh criteria have been met for the second user interface, using a static image of the second user interface at a particular point in time; determining that the user-interface-refresh criteria have been met for the second user interface; and in response to determining that the user-interface-refresh criteria have been met for the second user interface, refreshing the second user interface and replacing display of the static image of the second user interface with a dynamic version of the second user interface.

In some embodiments, the first user interface includes a representation of a first webpage, and the second user interface includes a representation of a second webpage different from the first webpage.

In some embodiments, the first user interface includes a representation of a first level in a hierarchical user interface, and the second user interface includes a representation of a second level in the hierarchical user interface, wherein the first level is different from the first level in a hierarchy of the hierarchical user interface.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B or FIG. 7. For example, detection operation 604, and sliding operations 612 and 614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a display, cause the device to:
   display a first user interface on the display;
   detect a first input that includes a first movement and that corresponds to a request to replace the first user interface with a second user interface;
   in response to detecting the first input:
      slide the first user interface off of the display in a first direction in accordance with the first movement, wherein a magnitude of the sliding of the first user interface off of the display is determined based on a magnitude of the first movement and a first movement proportionality factor; and
      concurrently slide the second user interface onto the display in the first direction over the first user interface in accordance with the first movement while sliding the first user interface off of the display, wherein:
         a magnitude of the sliding of the second user interface onto the display over the first user interface is determined based on a magnitude of the first movement and a second movement proportionality factor;
         the second movement proportionality factor is different from the first movement proportionality factor such that for a respective magnitude of the first movement, the magnitude of sliding the first user interface off the display is different from the magnitude of sliding the second user interface onto the display over the first user interface;

detect a second input that includes a second movement and that corresponds to a request to replace the second user interface with the first user interface; and, in response to detecting the second input:
slide the second user interface off of the display over the first user interface in a second direction in accordance with the second movement, wherein a magnitude of the sliding of the second user interface off of the display is determined based on a magnitude of the second movement and the second movement proportionality factor; and concurrently slide the first user interface onto the display in the second direction in accordance with the second movement while sliding the second user interface off of the display, wherein:
a magnitude of the sliding of the first user interface onto the display is determined based on a magnitude of the second movement and the first movement proportionality factor;
the second movement proportionality factor is different from the first movement proportionality factor such that for a respective magnitude of the second movement, the magnitude of sliding the second user interface off the display over the first user interface is different from the magnitude of sliding the first user interface onto the display;
a central portion of the first user interface is initially displayed; and
as the second movement progresses:
more of the left side of the first user interface is progressively revealed and
more of the right side of the first user interface is progressively revealed as the second user interface moves over the first user interface and as the first user interface moves onto the display.

2. The medium of claim 1, wherein concurrently sliding the second user interface onto the display in the first direction in accordance with the first movement while sliding the first user interface off of the display includes:
as the first movement progresses, progressively hiding more of the left side of the first user interface and the right side of the first user interface as the second user interface moves over the first user interface and as the first user interface moves off of the display; and
displaying a central portion of the first user interface immediately before ceasing to display the first user interface.

3. The medium of claim 1, comprising instructions, which when executed by the electronic device with the display, cause the device to:
while displaying the second user interface on the display, detect a third input that includes a third movement and corresponds to a request to replace the second user interface with a third user interface; and
in response to detecting the third input:
slide the second user interface off of the display in the first direction in accordance with the third movement, wherein a magnitude of the sliding of the second user interface off of the display is determined based on a magnitude of the third movement and the first movement proportionality factor; and
concurrently slide the third user interface onto the display in the first direction over the second user interface in accordance with the third movement while sliding the second user interface off of the display, wherein:
a magnitude of the sliding of the third user interface onto the display over the second user interface is determined based on a magnitude of the third movement and the second movement proportionality factor; and
the second movement proportionality factor is different from the first movement proportionality factor such that for a respective magnitude of the third movement, the magnitude of sliding the second user interface off the display is different from the magnitude of sliding the third user interface onto the display over the second user interface.

4. The medium of claim 1, wherein:
the first user interface and the second user interface are part of a sequence of user interfaces with an end; and
the medium, comprising instructions, which when executed by the electronic device with the display, cause the device to:
while displaying a respective user interface, detect a fourth input that corresponds to a request to slide the respective user interface off of the display in a respective direction away from a respective edge of the display; and
in response to detecting the fourth input:
in accordance with a determination that the respective user interface is not at the end of the sequence of user interfaces when sliding the sequence of user interfaces in the respective direction, move the user interface away from the respective edge of the display and display a next user interface moving over the respective user interface in the respective direction; and
in accordance with a determination that the respective user interface is at the end of the sequence of user interfaces when sliding the sequence of user interfaces in the respective direction, move the respective user interface away from the respective edge of the display without displaying the next user interface.

5. The medium of claim 4, comprising instructions, which when executed by the electronic device with the display, cause the device to: after moving the respective user interface away from the respective edge of the display without displaying the next user interface:
detect an end of the fourth input; and
in response to detecting an end of the fourth input, move the respective user interface back to the edge of the display.

6. The medium of claim 1, comprising instructions, which when executed by the electronic device with the display, cause the device to: while concurrently sliding the second user interface onto the display in the first direction over the first user interface in accordance with the first movement while sliding the first user interface off of the display, display a visual indication that the second user interface will move more quickly than the first user interface in response to detecting the first movement.

7. The medium of claim 1, wherein:
the display is a touchscreen display;
the first movement is movement of a contact on the touchscreen display;
the first movement proportionality factor is selected so that the amount of sliding of the first user interface in the first direction is less than the amount of movement of the contact on the touchscreen display in the first direction; and the second movement proportionality factor is selected so that the amount of sliding of the second user interface in the first direction is equal to the amount of movement of the contact on the touchscreen display in the first direction.

8. The medium of claim 1, wherein:
the second user interface includes dynamic content that changes over time; and
concurrently sliding the second user interface onto the display in the first direction over the first user interface in accordance with the first movement while sliding the first user interface off of the display includes, while sliding the second user interface onto the display over the first user interface:
  before user-interface-refresh criteria have been met for the second user interface, using a static image of the second user interface at a particular point in time;
  determining that the user-interface-refresh criteria have been met for the second user interface; and
  in response to determining that the user-interface-refresh criteria have been met for the second user interface, refreshing the second user interface and replacing display of the static image of the second user interface with a dynamic version of the second user interface.

9. The medium of claim 1, wherein:
the first user interface includes a representation of a first webpage; and
the second user interface includes a representation of a second webpage different from the first webpage.

10. The medium of claim 1, wherein:
the first user interface includes a representation of a first level in a hierarchical user interface; and
the second user interface includes a representation of a second level in the hierarchical user interface, wherein the second level is different from the first level in a hierarchy of the hierarchical user interface.

11. An electronic device, comprising:
a display;
one or more processors;
memory; and
one or more programs, wherein the one or more programs are stored in the memory and configured to be executed by the one or more processors, the one or more programs including instructions for:
  displaying a first user interface on the display;
  detecting a first input that includes a first movement and that corresponds to a request to replace the first user interface with a second user interface; and
  in response to detecting the first input:
    sliding the first user interface off of the display in a first direction in accordance with the first movement, wherein a magnitude of the sliding of the first user interface off of the display is determined based on a magnitude of the first movement and a first movement proportionality factor;
    concurrently sliding the second user interface onto the display in the first direction over the first user interface in accordance with the first movement while sliding the first user interface off of the display, wherein:
      a magnitude of the sliding of the second user interface onto the display over the first user interface is determined based on a magnitude of the first movement and a second movement proportionality factor; and
      the second movement proportionality factor is different from the first movement proportionality factor such that for a respective magnitude of the first movement, the magnitude of sliding the first user interface off the display is different from the magnitude of sliding the second user interface onto the display over the first user interface;
  detecting a second input that includes a second movement and that corresponds to a request to replace the second user interface with the first user interface; and,
  in response to detecting the second input:
    sliding the second user interface off of the display over the first user interface in a second direction in accordance with the second movement, wherein a magnitude of the sliding of the second user interface off of the display is determined based on a magnitude of the second movement and the second movement proportionality factor; and
    concurrently sliding the first user interface onto the display in the second direction in accordance with the second movement while sliding the second user interface off of the display, wherein:
      a magnitude of the sliding of the first user interface onto the display is determined based on a magnitude of the second movement and the first movement proportionality factor;
      the second movement proportionality factor is different from the first movement proportionality factor such that for a respective magnitude of the second movement, the magnitude of sliding the second user interface off the display over the first user interface is different from the magnitude of sliding the first user interface onto the display;
      a central portion of the first user interface is initially displayed; and
      as the second movement progresses:
        more of the left side of the first user interface is progressively revealed and
        more of the right side of the first user interface is progressively revealed as the second user interface moves over the first user interface and as the first user interface moves onto the display.

12. The electronic device of claim 11, wherein concurrently sliding the second user interface onto the display in the first direction in accordance with the first movement while sliding the first user interface off of the display includes:
  as the first movement progresses, progressively hiding more of the left side of the first user interface and the right side of the first user interface as the second user interface moves over the first user interface and as the first user interface moves off of the display; and
  displaying a central portion of the first user interface immediately before ceasing to display the first user interface.

13. The electronic device of claim 11, the one or more programs further include instructions for:
  while displaying the second user interface on the display, detecting a third input that includes a third movement and corresponds to a request to replace the second user interface with a third user interface; and
  in response to detecting the third input:

sliding the second user interface off of the display in the first direction in accordance with the third movement, wherein a magnitude of the sliding of the second user interface off of the display is determined based on a magnitude of the third movement and the first movement proportionality factor; and concurrently sliding the third user interface onto the display in the first direction over the second user interface in accordance with the third movement while sliding the second user interface off of the display, wherein:

a magnitude of the sliding of the third user interface onto the display over the second user interface is determined based on a magnitude of the third movement and the second movement proportionality factor; and the second movement proportionality factor is different from the first movement proportionality factor such that for a respective magnitude of the third movement, the magnitude of sliding the second user interface off the display is different from the magnitude of sliding the third user interface onto the display over the second user interface.

14. The electronic device of claim 11, wherein:
the first user interface and the second user interface are part of a sequence of user interfaces with an end; and
the one or more programs further include instructions for:
while displaying a respective user interface, detecting a fourth input that corresponds to a request to slide the respective user interface off of the display in a respective direction away from a respective edge of the display; and in response to detecting the fourth input:
in accordance with a determination that the respective user interface is not at the end of the sequence of user interfaces when sliding the sequence of user interfaces in the respective direction, moving the user interface away from the respective edge of the display and displaying a next user interface moving over the respective user interface in the respective direction; and in accordance with a determination that the respective user interface is at the end of the sequence of user interfaces when sliding the sequence of user interfaces in the respective direction, moving the respective user interface away from the respective edge of the display without displaying the next user interface.

15. The electronic device of claim 14, the one or more programs further including instructions for: after moving the respective user interface away from the respective edge of the display without displaying the next user interface:
detecting an end of the fourth input; and
in response to detecting an end of the fourth input, moving the respective user interface back to the edge of the display.

16. The electronic device of claim 11, the one or more programs further including instructions for: while concurrently sliding the second user interface onto the display in the first direction over the first user interface in accordance with the first movement while sliding the first user interface off of the display, displaying a visual indication that the second user interface will move more quickly than the first user interface in response to detecting the first movement.

17. The electronic device of claim 11, wherein:
the display is a touchscreen display;
the first movement is movement of a contact on the touchscreen display;
the first movement proportionality factor is selected so that the amount of sliding of the first user interface in the first direction is less than the amount of movement of the contact on the touchscreen display in the first direction; and
the second movement proportionality factor is selected so that the amount of sliding of the second user interface in the first direction is equal to the amount of movement of the contact on the touchscreen display in the first direction.

18. The electronic device of claim 11, wherein:
the second user interface includes dynamic content that changes over time; and
concurrently sliding the second user interface onto the display in the first direction over the first user interface in accordance with the first movement while sliding the first user interface off of the display includes, while sliding the second user interface onto the display over the first user interface:
before user-interface-refresh criteria have been met for the second user interface, using a static image of the second user interface at a particular point in time;
determining that the user-interface-refresh criteria have been met for the second user interface; and
in response to determining that the user-interface-refresh criteria have been met for the second user interface, refreshing the second user interface and replacing display of the static image of the second user interface with a dynamic version of the second user interface.

19. The electronic device of claim 11, wherein:
the first user interface includes a representation of a first webpage; and
the second user interface includes a representation of a second webpage different from the first webpage.

20. The electronic device of claim 11, wherein:
the first user interface includes a representation of a first level in a hierarchical user interface; and
the second user interface includes a representation of a second level in the hierarchical user interface, wherein the second level is different from the first level in a hierarchy of the hierarchical user interface.

21. A method, comprising:
at an electronic device with a display:
displaying a first user interface on the display;
detecting a first input that includes a first movement and that corresponds to a request to replace the first user interface with a second user interface; and
in response to detecting the first input:
sliding the first user interface off of the display in a first direction in accordance with the first movement, wherein a magnitude of the sliding of the first user interface off of the display is determined based on a magnitude of the first movement and a first movement proportionality factor; and
concurrently sliding the second user interface onto the display in the first direction over the first user interface in accordance with the first movement while sliding the first user interface off of the display, wherein:
a magnitude of the sliding of the second user interface onto the display over the first user interface is determined based on a magnitude of the first movement and a second movement proportionality factor;

the second movement proportionality factor is different from the first movement proportionality factor such that for a respective magnitude of the first movement, the magnitude of sliding the first user interface off the display is different from the magnitude of sliding the second user interface onto the display over the first user interface;

detecting a second input that includes a second movement and that corresponds to a request to replace the second user interface with the first user interface; and, in response to detecting the second input:
sliding the second user interface off of the display over the first user interface in a second direction in accordance with the second movement, wherein a magnitude of the sliding of the second user interface off of the display is determined based on a magnitude of the second movement and the second movement proportionality factor; and
concurrently sliding the first user interface onto the display in the second direction in accordance with the second movement while sliding the second user interface off of the display, wherein:
a magnitude of the sliding of the first user interface onto the display is determined based on a magnitude of the second movement and the first movement proportionality factor;
the second movement proportionality factor is different from the first movement proportionality factor such that for a respective magnitude of the second movement, the magnitude of sliding the second user interface off the display over the first user interface is different from the magnitude of sliding the first user interface onto the display;
a central portion of the first user interface is initially displayed; and
as the second movement progresses:
more of the left side of the first user interface is progressively revealed and
more of the right side of the first user interface is progressively revealed as the second user interface moves over the first user interface and as the first user interface moves onto the display.

* * * * *